(12) United States Patent
Kazar et al.

(10) Patent No.: US 7,721,045 B1
(45) Date of Patent: *May 18, 2010

(54) SYSTEM AND METHOD FOR EFFICIENTLY GUARANTEEING DATA CONSISTENCY TO CLIENTS OF A STORAGE SYSTEM CLUSTER

(75) Inventors: Michael Kazar, Pittsburgh, PA (US); Robert M. English, Menlo Park, CA (US); Richard P. Jernigan, IV, Ambridge, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/048,659

(22) Filed: Mar. 14, 2008

Related U.S. Application Data

(63) Continuation of application No. 11/261,007, filed on Oct. 28, 2005, which is a continuation-in-part of application No. 10/727,169, filed on Dec. 2, 2003, now Pat. No. 7,302,520.

(51) Int. Cl.
*G06F 12/16* (2006.01)
(52) U.S. Cl. ...................................... 711/114
(58) Field of Classification Search .................. None
See application file for complete search history.

(56) References Cited

U.S. PATENT DOCUMENTS

| 4,570,217 A | 2/1986 | Allen et al. |
| 5,124,987 A | 6/1992 | Milligan et al. |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |
| 5,581,724 A | 12/1996 | Belsan et al. |

(Continued)

FOREIGN PATENT DOCUMENTS

JP    10003440 A    6/1998

(Continued)

OTHER PUBLICATIONS

Notification of Transmittal of the International Search Report and the Written Opinion of the International Searching Authority, or the Declaration. PCT/US2006/016055. Apr. 27, 2006.

(Continued)

*Primary Examiner*—Tuan V Thai
*Assistant Examiner*—Duc T Doan
(74) *Attorney, Agent, or Firm*—Cesari and McKenna, LLP

(57) ABSTRACT

A method for operating a computer storage system is disclosed. One or more data storage devices are configured to store a data content of a data container. A data structure having a plurality of permitted modification times (mtimes) is generated, the mtimes to control modifying a data stored in the data container. An I/O operation is performed by the storage system in response to a selected mtime. A request for the I/O operation is received from a client, and the data structure having a plurality of permitted modification times (mtimes) is generated in response to the request. The selected mtime is transmitted to the client, and an I/O operation is requested by the client in response to the selected mtime. The I/O operation is performed as an atomic I/O operation.

22 Claims, 18 Drawing Sheets

U.S. PATENT DOCUMENTS

| | | | |
|---|---|---|---|
| 5,819,292 A | 10/1998 | Hitz et al. | |
| 6,061,770 A | 5/2000 | Franklin | |
| 6,081,875 A | 6/2000 | Clifton et al. | |
| 6,341,341 B1 | 1/2002 | Grummon et al. | |
| 6,564,252 B1 | 5/2003 | Hickman et al. | |
| 6,658,417 B1* | 12/2003 | Stakutis et al. | 707/10 |
| 6,671,773 B2 | 12/2003 | Kazar et al. | |
| 7,127,577 B2 | 10/2006 | Koning et al. | |
| 7,302,520 B2 | 11/2007 | Kazar et al. | |
| 7,409,494 B2 | 8/2008 | Edwards | |
| 7,409,497 B1 | 8/2008 | Kazar et al. | |
| 2004/0068636 A1* | 4/2004 | Jacobson et al. | 711/203 |
| 2004/0139167 A1 | 7/2004 | Edsall et al. | |
| 2005/0144178 A1* | 6/2005 | Chrin et al. | 707/100 |
| 2005/0192932 A1 | 9/2005 | Kazar et al. | |

FOREIGN PATENT DOCUMENTS

| | | |
|---|---|---|
| WO | WO 00/07101 A1 | 2/2000 |

OTHER PUBLICATIONS

Efficient, Distributed Data Placement Strategies for Storage Area Networks, Andrew Brinkmann, et al. XP-002404501, 2000.

Disk Subsystem Load Balancing: Disk Striping vs. Conventional Data Placement, Gregory R. Ganger, et al. Department of Electrical Engineering and Computer Science, University of Michigan, Ann Arbor. Jan. 5, 1993.

A Fast Algorith for Online Placement and Reorganization of Replicated Data, R.J. Honicky, et al. Storage Systems Research Center, University of California, Santa Cruz. Apr. 22, 2003.

A Row Permutated Data Reorganization Algorithm for Growing Server-Less Video-on-Demand Systems, T.K. Ho, et al. Department of Information Engineering, The Chinese University of Hong Knog, Shatin, N.T., Hong Kong. May 12, 2003.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

\* cited by examiner

SYSTEM AND METHOD FOR EFFICIENTLY GUARANTEEING DATA CONSISTENCY TO CLIENTS OF A STORAGE SYSTEM CLUSTER

RELATED APPLICATION

This application is a Continuation application of U.S. patent application Ser. No. 11/261,007, entitled SYSTEM AND METHOD FOR EFFICIENTLY GUARANTEEING DATA CONSISTENCY TO CLIENTS OF A STORAGE SYSTEM CLUSTER, by Michael Kazar et al., filed on Oct. 28, 2005, which is a Continuation-in-Part application of Ser. No. 10/727,169 filed Dec. 2, 2003 U.S. Pat. No. 7,302,520, entitled METHOD AND APPARATUS FOR DATA STORAGE USING STRIPING, by Michael L. Kazar, et al, granted on Nov. 27, 2007, the contents of which are hereby incorporated by reference.

The present application is also related to U.S. Patent Publication No. US 2005/0192932, entitled STORAGE SYSTEM ARCHITECTURE FOR STRIPING DATA CONTAINER CONTENT ACROSS VOLUMES OF A CLUSTER, by Michael Kazar, et al., the contents of which are hereby incorporated by reference.

FIELD OF THE INVENTION

The present invention relates to clustered computer environments and, more particularly, to guaranteeing data consistency to clients of a storage system cluster.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that file may exceed its processing resources and become overburdened, with a concomitant degradation of speed and performance.

One technique for overcoming the disadvantages of having a single file that is heavily utilized is to stripe the file across a plurality of volumes configured as a striped volume set (SVS), where each volume, such as a data volume (DV), is serviced by a different storage system, thereby distributing the load for the single file among a plurality of storage systems. A technique for data container (such as a file) striping is described in the above-referenced U.S. Patent Publication No. US 2005/0192932, entitled STORAGE SYSTEM ARCHITECTURE FOR STRIPING DATA CONTAINER CONTENT ACROSS VOLUMES OF A CLUSTER. According to the data container striping arrangement, each storage system of may service access requests (i.e., file operations) from clients directed to the same file. File operations, such as read and write operations, are forwarded directly to the storage systems that are responsible for their portions of the data for that file.

In addition to the file data, there are meta-data, such as timestamps and length, associated with the file. A timestamp is a file attribute that provides an indication of the last time the file was modified, i.e., the modification time (mtime) for the file. The mtime is typically consulted on every operation directed to the file and, in the case of a write operation, is changed. For example, in response to a read operation issued by a client, the storage system returns the data and the current mtime on the file, whereas in response to a write operation, the storage system returns an incremented mtime. Effectively, every successive write operation is accorded a greater mtime than the one before it.

Many client protocols, such as the Network File System (NFS) protocol, allow use of client-side "caching" of data retrieved from a storage system. In response to a read operation issued by a client for a file, the storage system returns the requested data along with the current mtime of the file. The client stores the information in a cache memory so that future read operations directed to that file data may be serviced locally at the client (from the cache) instead of remotely over the network. For client-side caching to operate properly, there must be guarantees that the data subsequently retrieved from the cache is consistent with the actual file system and not "stale", i.e., that the file data has not changed since it was cached at the client. To that end, the NFS protocol enables periodic "pinging" (polling) of the state of the file by the client through requests for the current mtime of the file from the storage system If the mtime has not increased since the data was cached, the client-side cache is maintained "fresh" and the client continues to use the cached data. If the mtime has changed, then the client discards its cached data and reissues a read operation to the storage system for file data.

Note that, as used herein, file operations are "serializable" if they can be replayed in a reported order and the result is identical to the actual file system. File operations are "causally connected" if they affect the same meta-data or the same region of the same file. Some client protocols (like NFSv2) require "strong serialization semantics"; that is, mtimes must always increase for operations that complete with increasing wall-clock time, even if they are not casually connected. "Weak serialization semantics", on the other hand, only require that mtimes always increase for operation that complete with increasing wall-clock time if the operations are causally connected.

Certain file system protocols, such as the Common Internet File System (CIFS) protocol, support weak serialization semantics because of the nature of soft locks, such as opportunistic locks (op-locks). An op-lock is an automatically revocable soft lock that allows a client to operate on a range of file data until such time as a server (e.g., the storage system) instructs the client to stop. That is, the client can cache the data and perform read and write operations on the cached data until the storage system instructs it to return is that data to the system. The client can cache the results of write operations since it knows that no other access is allowed to that same region of the file as long as it has an op-lock on the region. As soon as a second client attempts a conflicting operation on that region of the file, the storage system blocks the conflicting operation and revokes the op-lock. In particular, the storage system instructs the client to return ("flush") any write modifications to the system and then discard the entire content of its client-side cache. Once that happens, the storage system unblocks the second client and grants it an op-lock to the conflicting region.

NFSv2 and NFSv3 protocols do not utilize op-locks and, thus, do not employ the above revocation system. For these protocols, the storage system must rely on strong serialization semantics. Other protocols, such as the NFSv4 protocol, use a type of soft lock called delegations that allows the storage system to use weak serialization semantics. Because CIFS and NFSv4 clients rely on such a "rough" protocol for guaranteeing consistency of cached data, they are not concerned with mtimes associated with read and write operations. This, in turn, enables the storage system to service such operation requests with weak serialization semantics.

In the data container striping arrangement described above, there is one volume, i.e., the container attribute volume (CAV), which is responsible for all the timestamps of a particular file stored on the SVS. As a result, for each file operation, the DV accesses the CAV to determine the mtime for the file. In response, the CAV updates the mtime on disk and returns the updated mtime to the DV which, in turn, returns the mtime and any associated data to the client. This arrangement places a substantial load on the storage system serving the CAV with a concomitant decrease in system performance. Moreover, depending on the load of the SVS, the meta-data requests to/from the CAV may become a bottleneck that adversely impacts performance of the system by, e.g., causing certain storage systems to stall (wait) until their meta-data requests have been processed before servicing client data access requests.

SUMMARY OF THE INVENTION

The present invention overcomes the disadvantages of the prior art by providing a system and method for efficiently guaranteeing data consistency to clients for one or more data containers stored on a plurality of volumes configured as a striped volume set (SVS) and served by a plurality of nodes, e.g., storage systems, connected as a cluster. The SVS comprises one meta-data volume (MDV) configured to store a canonical copy of certain meta-data, including access control lists and directories, associated with all data containers stored on the SVS, and one or more data volumes (DVs) configured to store, at least, data content of those containers. In addition, for each data container stored on the SVS, one volume is designated a container attribute volume (CAV) and, as such, is configured to store a canonical copy of certain, rapidly-changing attribute meta-data, including timestamps and length, associated with that container.

Efficient data consistency guarantees of data containers stored on the SVS are generally provided by delegating to the DVs sufficient authority to autonomously service input/output (I/O) requests directed to the data containers using at least some of the rapidly-changing attribute meta-data, e.g., the timestamps, of the containers. Specifically, a disk element of a storage system serving a DV (hereinafter "DV") is only allowed to service I/O requests, e.g., read and write operations, to a data container, such as a file, if it has a valid ticket book for the file. The DV illustratively requests and is granted the ticket book from a disk element of the storage system serving the CAV (hereinafter "CAV") on a per-file basis.

In the illustrative embodiment, the ticket book is a data structure generated by the CAV and comprising an indication of current timestamps, such as the current modification time (mtime), on the file plus zero or more "tickets", i.e., new mtime values, that the DV is allowed to "hand out" (return) to a client for each new write operation. The types of ticket books illustratively include (i) a read ticket book that contains the current mtime and no tickets and (ii) a write ticket book that contains the current mtime and tickets representing a range of mtimes. Write operations require a write ticket book, while read and prefetch operations require at least a read ticket book. The write ticket book (hereinafter "ticket book") is illustratively a read ticket book with one or more tickets that can be used to change the timestamps in response to write operations.

According to one aspect of the present invention, the ticket book is employed to improve storage system performance for clients that do not require strong serialization semantics. That is, for clients using file system protocols that support weak serialization semantics, the DV may utilize the ticket book in a manner that obviates the need to guarantee that the mtimes, as perceived by the clients, always increase. For clients using file system protocols that require strong serialization semantics, the DV may only use the ticket book if it received file operations prior to requesting (and granting of) that ticket book. Otherwise, the ticket book must be revoked and a new ticket book must be requested (and granted) from the CAV. Use of the ticket book in connection with weak serialization semantics thus reduces the number of round trip exchanges needed between the DV and CAV to service file operations. In other words, because the DV does not have to stall operation requests waiting for the grant of a new ticket book, the number of round trip exchanges is reduced compared to the number of round trip exchanges needed for protocols that require strong serialization semantics.

Another aspect of the invention is directed to the use of the ticket book with a file extending operation, e.g., a write operation that spans end-of-file (EOF) and increases the length of a file. In response to servicing a write operation that attempts to extend the file, the DV advises the CAV as to the new length of the file and, in return, the CAV grants a new ticket book reflective of that new file length. In particular, the CAV invalidates all outstanding ticket books to all DVs, updates the length of the file and returns the new ticket book to the advising DV. Since no other valid ticket books are in use, each DV must poll the CAV for an updated ticket book before servicing a new I/O operation. The new ticket book has tickets reflective of higher mtimes, and includes the correct new file length.

According to yet another aspect of the invention, a kinetic token is provided that represents an optimization that enables the storage system to defeat caching behavior at the client and improve the performance of file operations. A kinetic token is a guarantee that every time a client requests the current mtime on the file, the client will receive a higher value than has been previously reported. Issuance of a kinetic token by the CAV effectively disables client-side caching because every time the client requests the current mtime, it will receive a higher mtime value. Having disabled client-side caching in this manner, some protocols (such as NFSv3) can be satisfied with weak serialization semantics.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
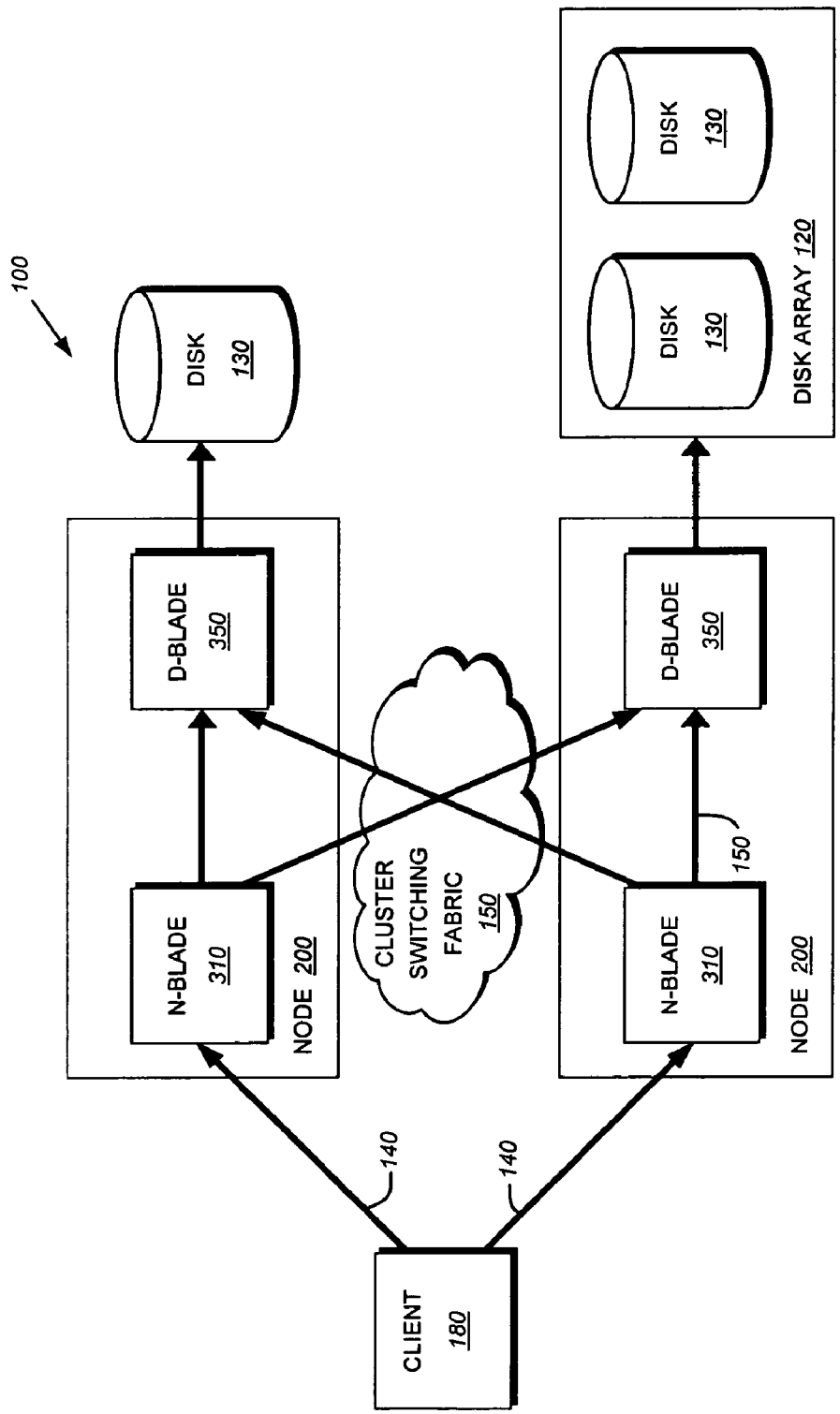
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773, titled METHOD AND SYSTEM FOR RESPONDING TO FILE SYSTEM REQUESTS, by M. Kazar et al. granted Dec. 30, 2003. It should be noted that while there is shown an equal number of N and D-blades in the illustrative cluster 100, there may be differing numbers of N and/or D-blades in accordance with various embodiments of the present invention. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only.

The clients 180 may be general-purpose computers configured to interact with the node 200 in accordance with a client/server model of information delivery. That is, each is client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
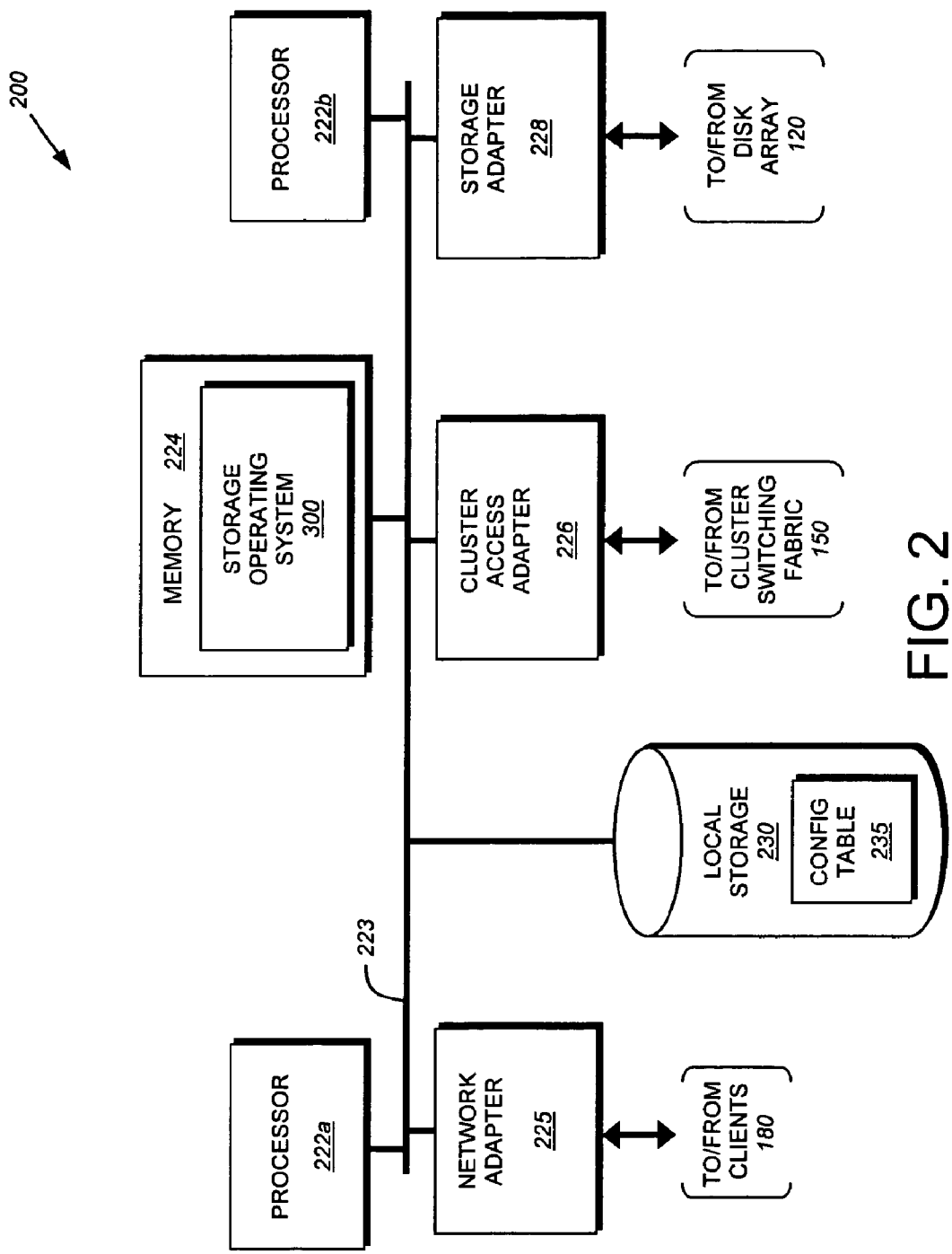
FIG. 2 is a schematic block diagram of a node, such as a storage system, in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual is disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
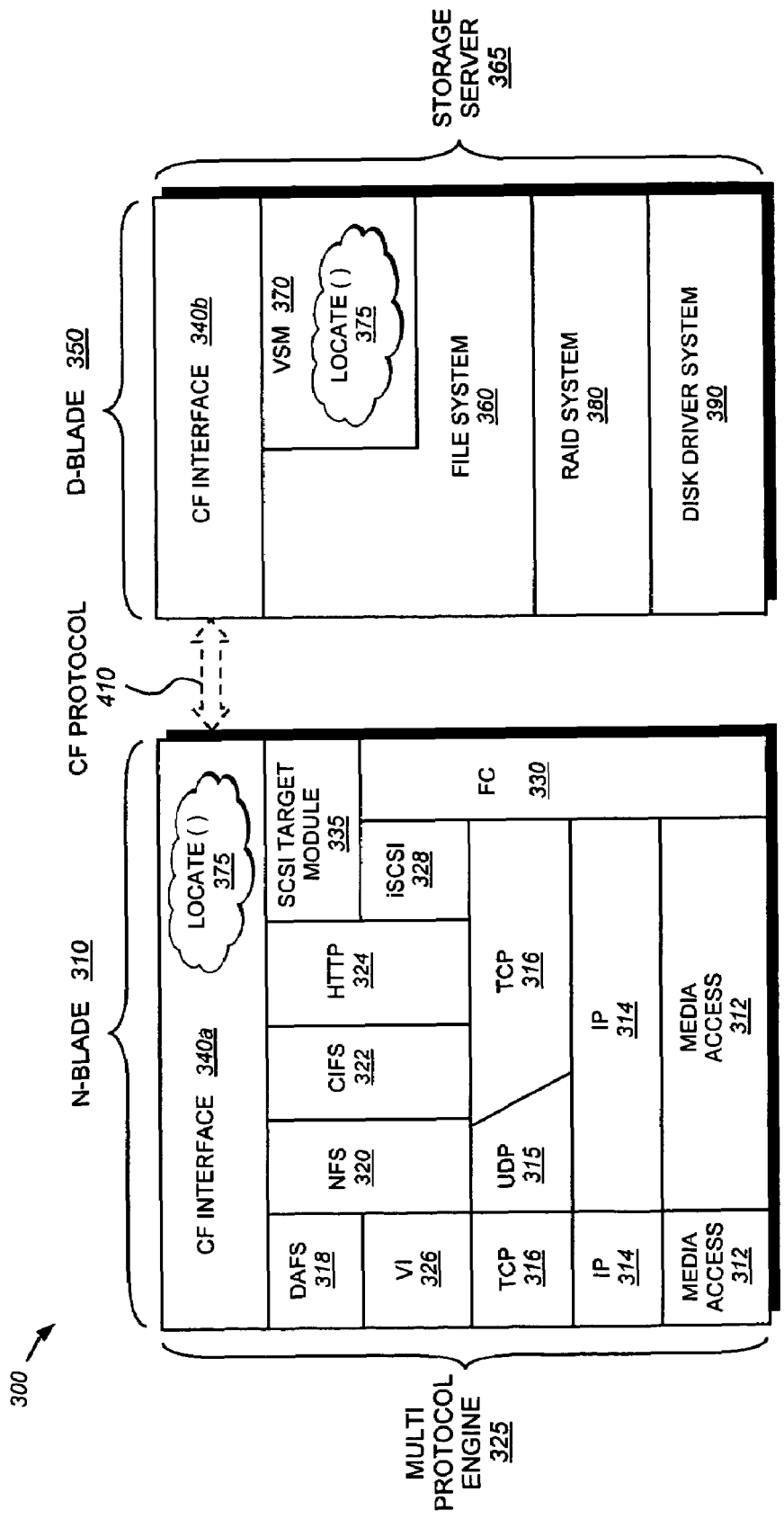
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) described herein. As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as timestamps, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk, dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose node or computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 340a,b adapted to implement intra-cluster communication among the blades, including D-blade-to-D-blade communication, for data container striping operations described herein.

The protocol layers, e.g., the NFS/CIFS layers and the iSCSI/FC layers, of the N-blade 310 function as protocol servers that translate file-based and block based data access requests from clients into CF protocol messages used for communication with the D-blade 350. That is, the N-blade servers convert the incoming data access requests into file system primitive operations (commands) that are embedded within CF messages by the CF interface module 340 for transmission to the D-blades 350 of the cluster 100. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340b on D-blade 350 de-encapsulates the CF message and processes the file system command.

Figure 4:
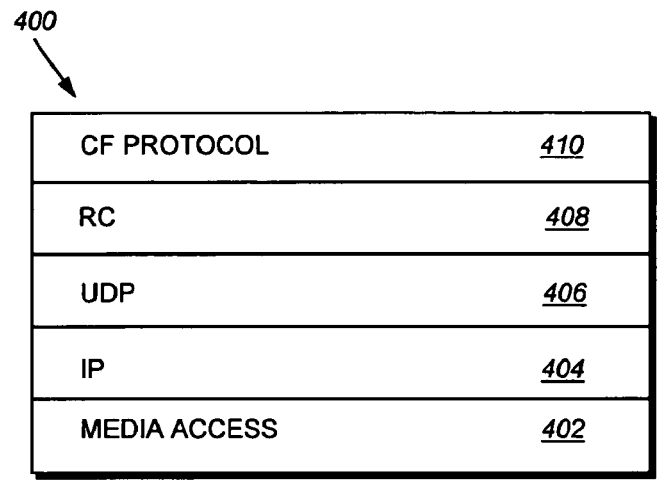
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote blades of the cluster 100; however, it should be understood that the term "CF message" may be used generally to refer to LPC and RPC communication between blades of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., is an N-blade 310) to a destination (e.g., a D-blade 350). The RC layer 408 implements a reliable transport protocol that is adapted to process such envelopes in accordance with a connectionless protocol, such as UDP 406.

Figure 5:
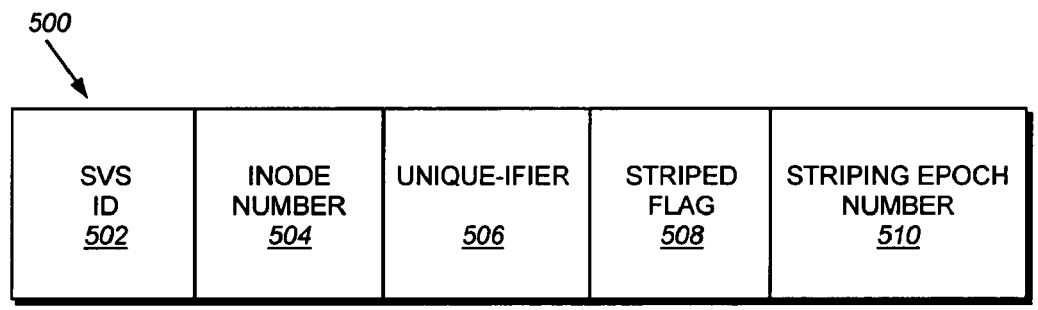
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
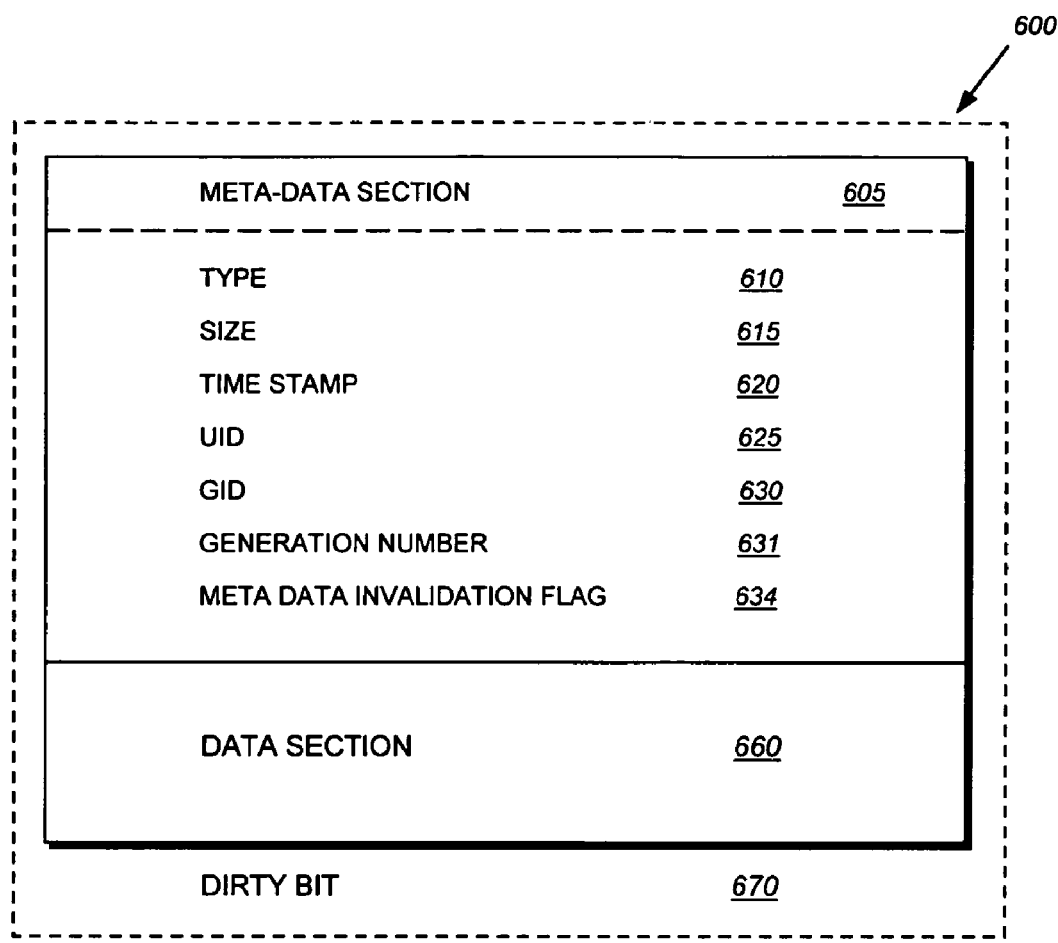
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, timestamps (e.g., access and/or modification time) 620 and ownership, i.e., user identifier (UID 625) and group ID (GID 630), of the file. The meta-data section 605 also includes a generation number 631 and a meta-data invalidation flag field 634. As described further herein, meta-data invalidation flag field 634 is used to indicate whether meta-data in the inode is usable or whether it should be re-acquired from the MDV. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 kB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 660 of the inode (e.g., a second level inode) references an indirect block (e.g., a first level L1 block) that contains 1024 pointers, each of which references a 4 kB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 kB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819, 292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al.

Figure 7:
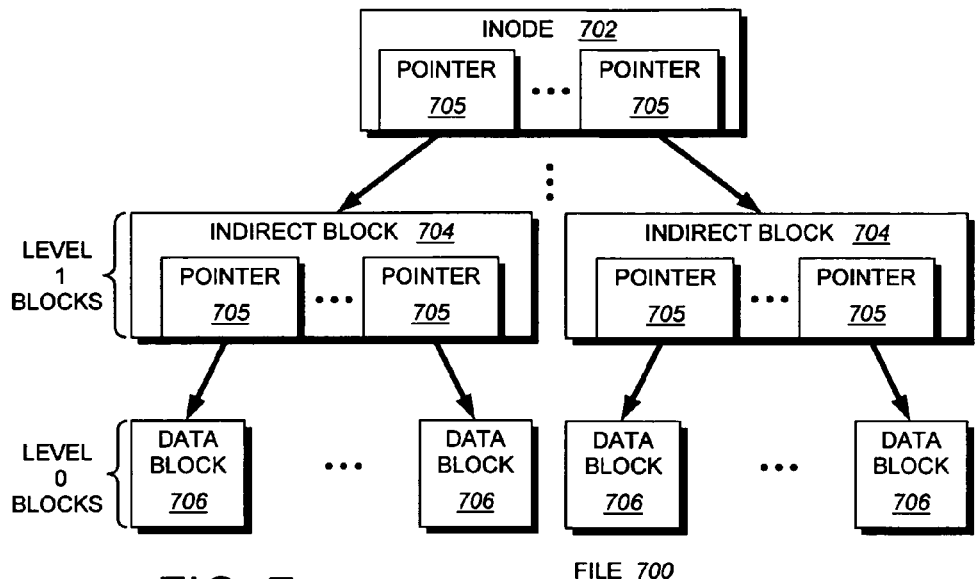
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volumes) of a storage system, such as node 200. An example of such a file system layout is described in U.S. Patent Publication No. US 2005/0246401, titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk, dbn occurs at the file system/RAID system boundary of the storage operating system 300.

Figure 8:
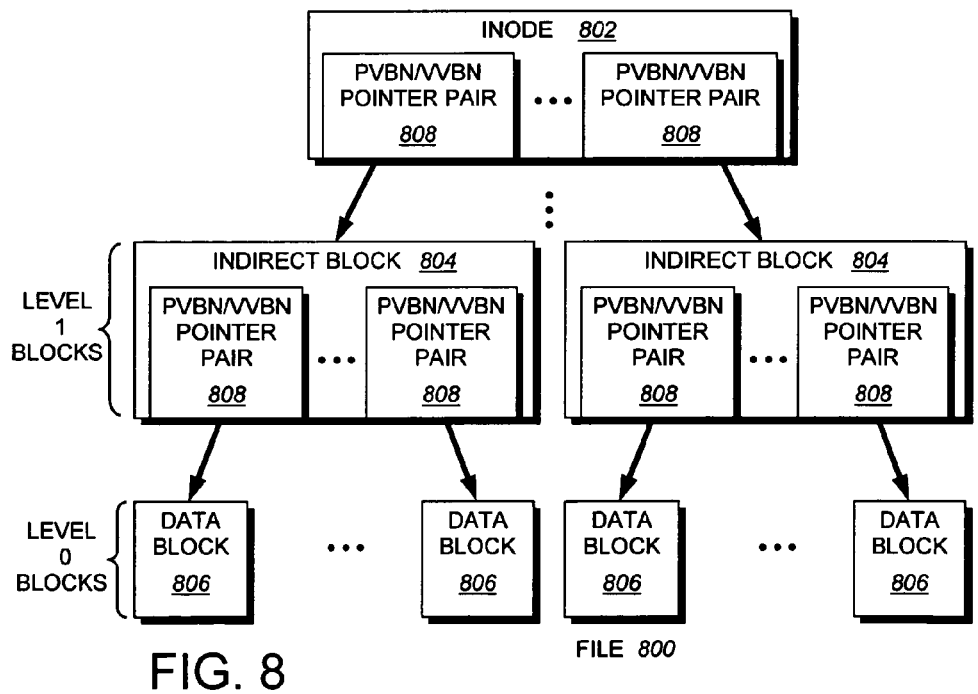
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
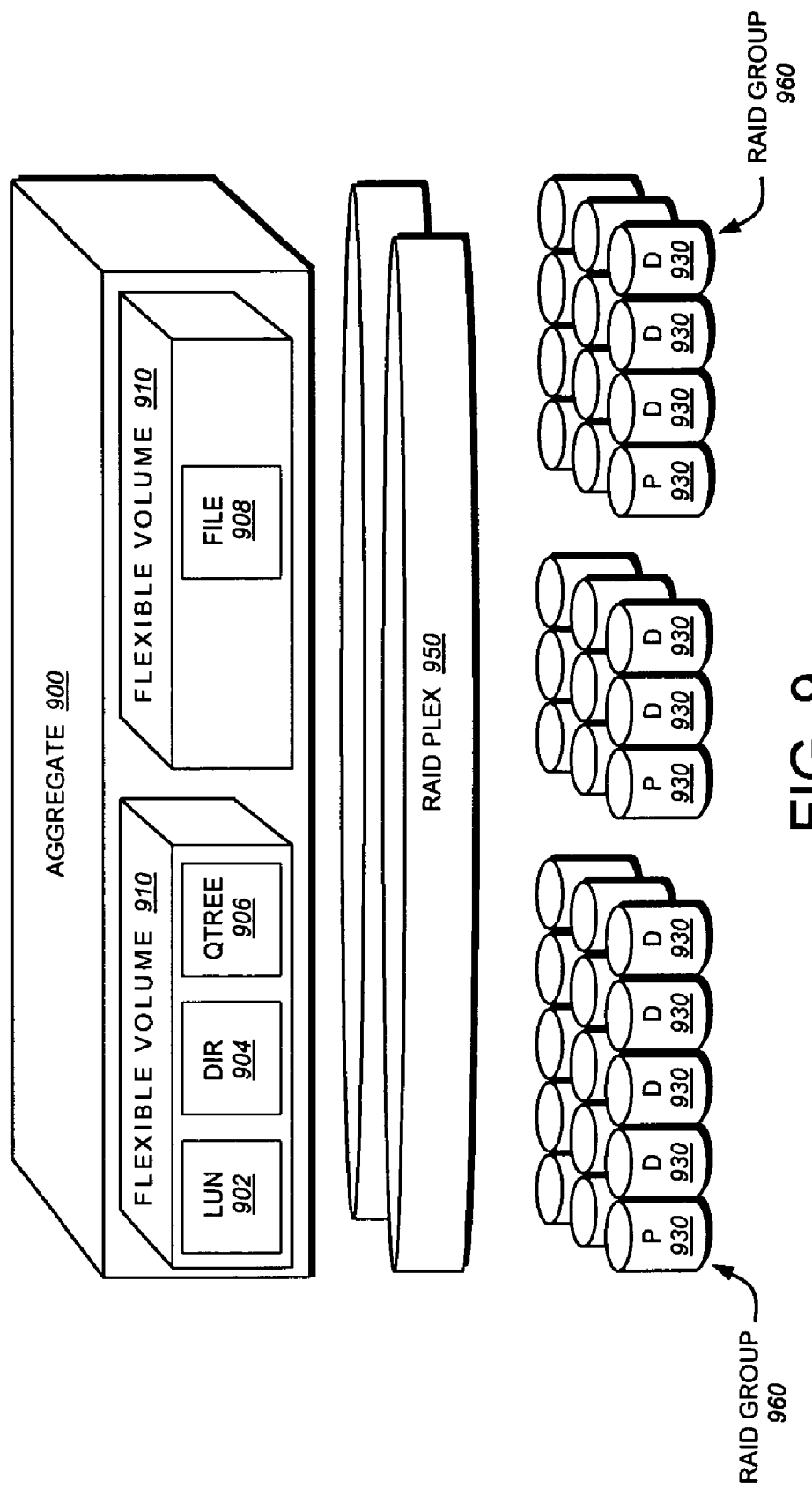
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
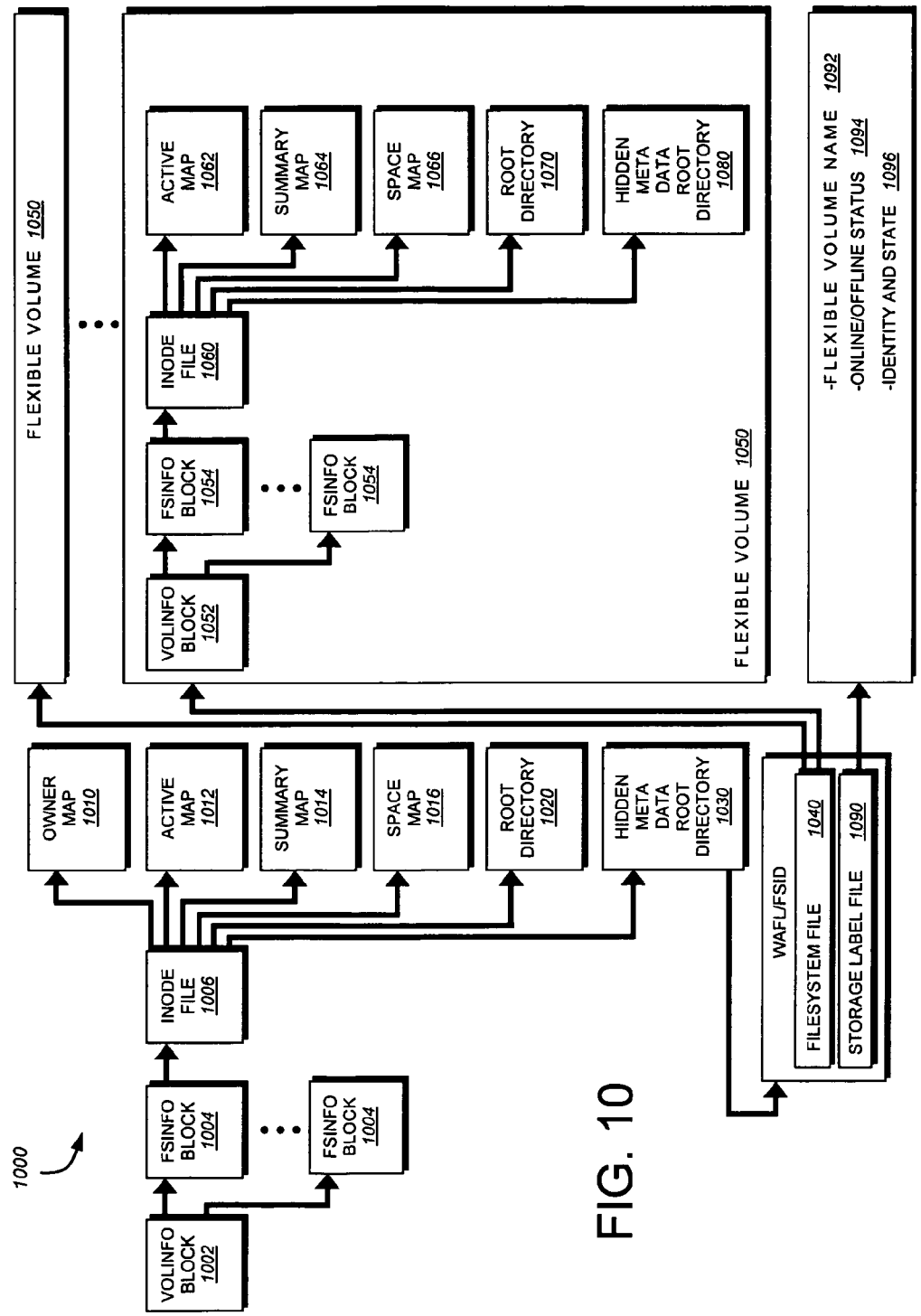
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/ directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
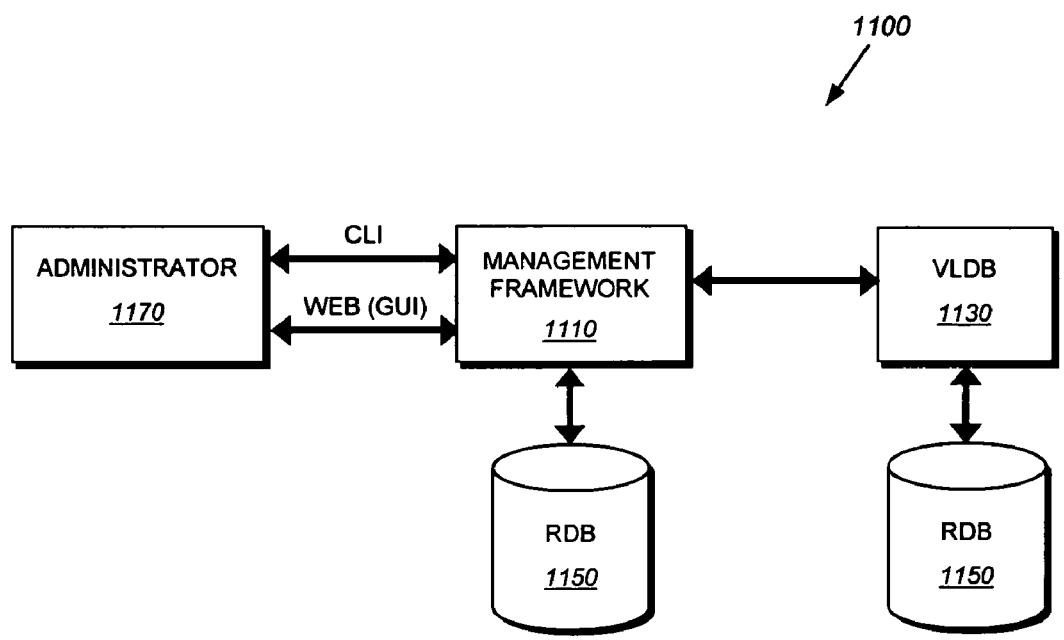
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-blade 310 of each node accesses a configuration table 235 that maps the SVS ID 502 of a data container handle 500 to a D-blade 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
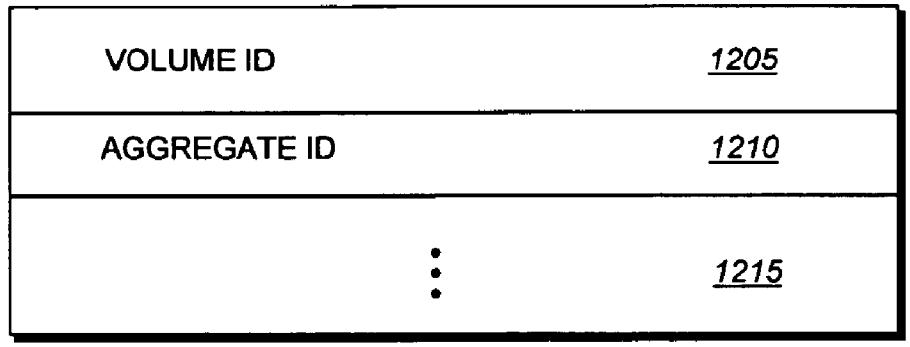
FIG. 12 is a schematic block diagram of a volume location database (VLDB) volume entry in accordance with an embodiment of the present invention.
Figure 13:
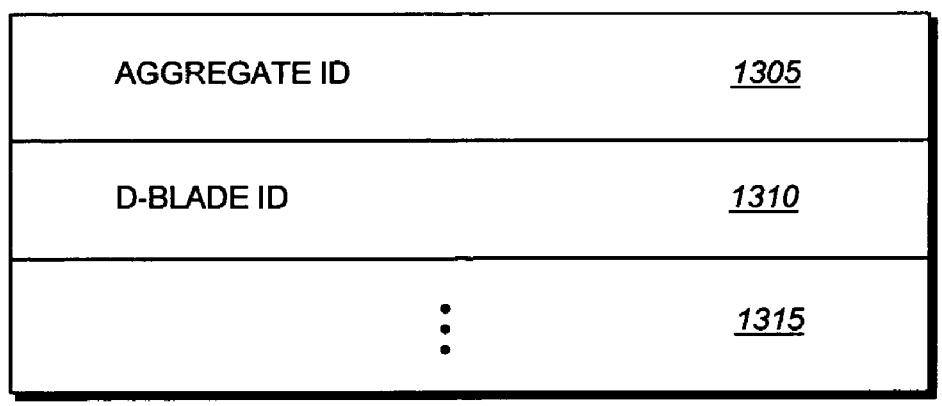
FIG. 13 is a schematic block diagram of a VLDB aggregate entry in accordance with an embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-blade ID field 1310 and, in alternate embodiments, additional fields 1315. The aggregate ID field 1305 contains an ID of a particular aggregate 900 in the cluster 100. The D-blade ID field 1310 contains an ID of the D-blade hosting the particular aggregate identified by the aggregate ID field 1305.

The VLDB illustratively implements a RPC interface, e.g., a Sun RPC interface, which allows the N-blade 310 to query the VLDB 1130. When encountering contents of a data container handle 500 that are not stored in its configuration table, the N-blade sends an RPC to the VLDB process. In response, the VLDB 1130 returns to the N-blade the appropriate mapping information, including an ID of the D-blade that owns the data container. The N-blade caches the information in its configuration table 235 and uses the D-blade ID to forward the incoming request to the appropriate data container. All functions and interactions between the N-blade 310 and D-blade 350 are coordinated on a cluster-wide basis through the collection of management processes and the RDB library user mode applications 1100. When processing an SVS, the N-blade caches the striping rules that determine which stripes of data lie in which container.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Storage System Architecture

The present invention is related to a storage system architecture illustratively comprising two or more volumes 910 distributed across a plurality of nodes 200 of cluster 100. The volumes are organized as a SVS and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding of the present invention, data containers are hereinafter referred to generally as "files".

The SVS comprises a meta-data volume (MDV) and one or more data volumes (DV). The MDV is configured to store a canonical copy of certain meta-data, including access control lists (ACLs) and directories, associated with all files stored on the SVS, whereas each DV is configured to store, at least, data content of those files. For each file stored on the SVS, one volume is designated the container attribute volume (CAV) and, to that end, is configured to store ("cache") certain, rapidly-changing attribute meta-data, including time stamps and file length, associated with that file to thereby offload access requests that would otherwise be directed to the MDV.

In the illustrative embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In alternate embodiments, data for files is striped across the MDV and the DVs.

Figure 14:
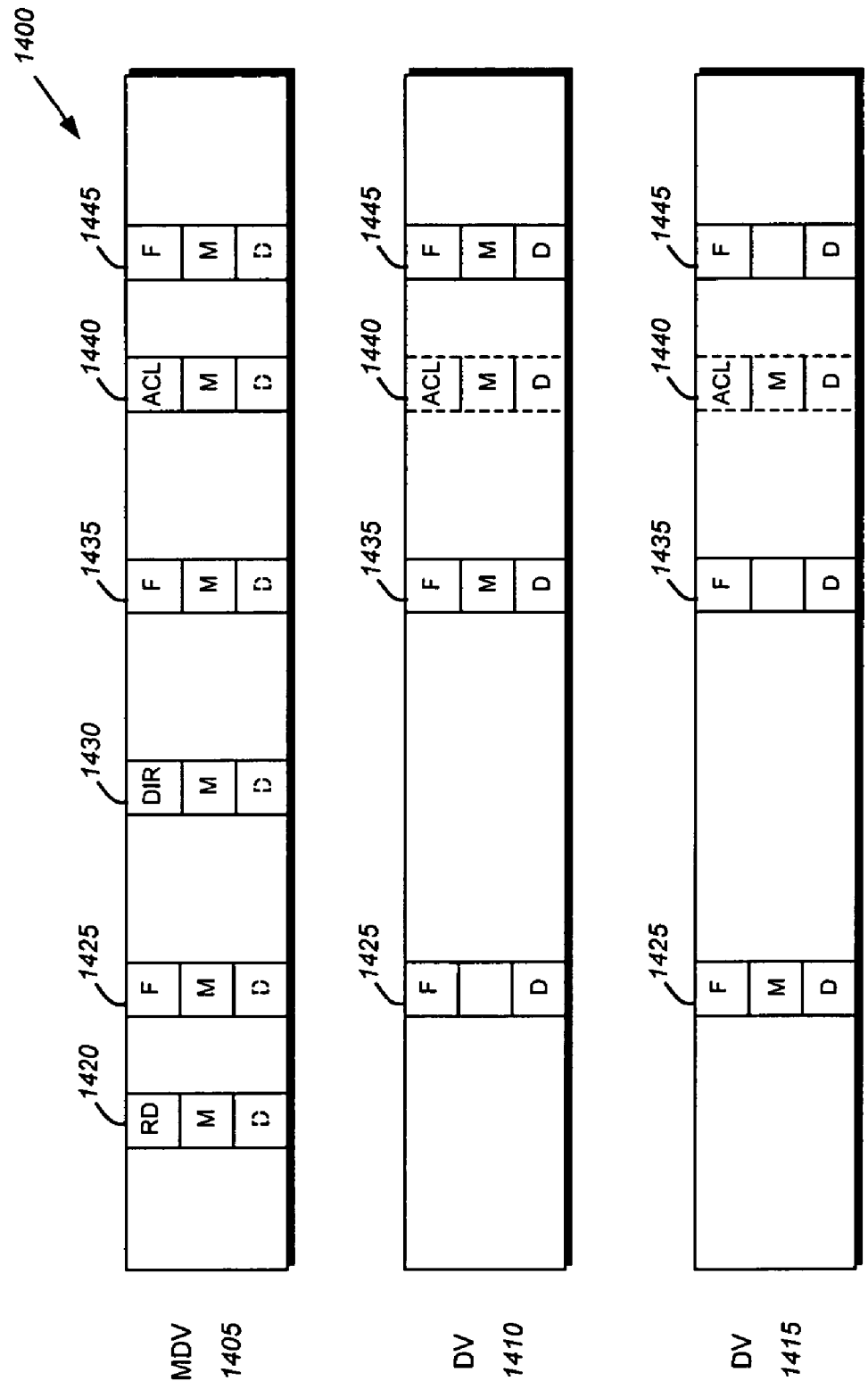
FIG. 14 is a schematic block diagram of a striped volume set (SVS) in accordance with an embodiment of the present invention.

FIG. 14 is a schematic block diagram of the inode files of an SVS 1400 in accordance with an embodiment of the present invention. The SVS 1400 illustratively comprises three volumes, namely MDV 1405 and two DVs 1410, 1415. It should be noted that in alternate embodiments additional and/or differing numbers of volumes may be utilized in accordance with the present invention. Illustratively, the MDV 1405 stores a is plurality of inodes, including a root directory (RD)

inode 1420, a directory (DIR) inode 1430, file (F) inodes 1425, 1435, 1445 and an ACL inode 1440. Each of these inodes illustratively includes meta-data (M) associated with the inode. In the illustrative embodiment, each inode on the MDV 1405 does not include data (D); however, in alternate embodiments, the MDV may include user data.

In contrast, each DV 1410, 1415 stores only file (F) inodes 1425, 1435, 1445 and ACL inode 1440. According to the inventive architecture, a DV does not store directories or other device inodes/constructs, such as symbolic links; however, each DV does store F inodes, and may store cached copies of ACL inodes, that are arranged in the same locations as their respective inodes in the MDV 1405. A particular DV may not store a copy of an inode until an I/O request for the data container associated with the inode is received by the D-blade serving a particular DV. Moreover, the contents of the files denoted by these F inodes are periodically sparse according to SVS striping rules, as described further herein. In addition, since one volume is designated the CAV for each file stored on the SVS 1400, DV 1415 is designated the CAV for the file represented by inode 1425 and DV 1410 is the CAV for the files identified by inodes 1435, 1445. Accordingly, these CAVs cache certain, rapidly-changing attribute meta-data (M) associated with those files such as, e.g., file size 615, as well as access and/or modification time (mtime) stamps 620.

Figure 15:
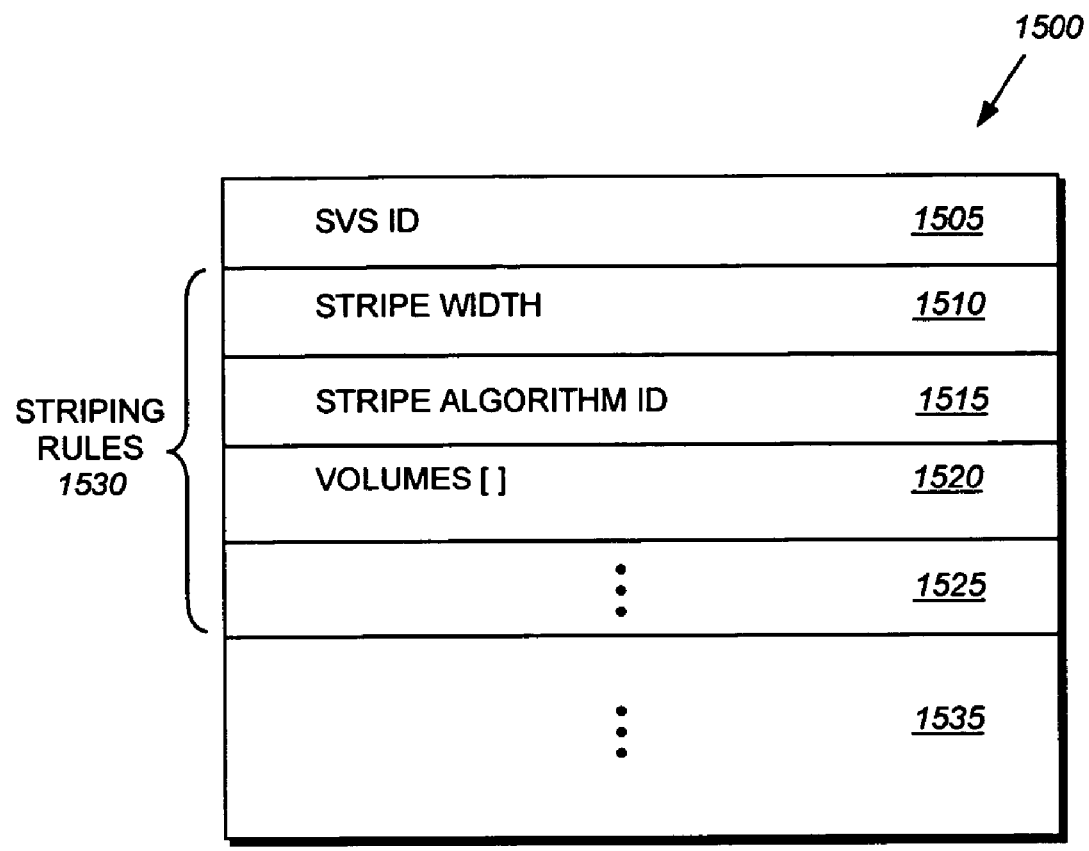
FIG. 15 is a schematic block diagram of a VLDB SVS entry in accordance with an embodiment the present invention.

The SVS is associated with a set of striping rules that define a stripe algorithm, a stripe width and an ordered list of volumes within the SVS. The striping rules for each SVS are illustratively stored as an entry of VLDB 1130 and accessed by SVS ID. FIG. 15 is a schematic block diagram of an exemplary VLDB SVS entry 1500 in accordance with an embodiment of the present invention. The VLDB entry 1500 includes a SVS ID field 1505 and one or more sets of striping rules 1530. In alternate embodiments additional fields 1535 may be included. The SVS ID field 1505 contains the ID of a SVS which, in operation, is specified in data container handle 500.

Each set of striping rules 1530 illustratively includes a stripe width field 1510, a stripe algorithm ID field 1515, an ordered list of volumes field 1520 and, in alternate embodiments, additional fields 1525. The striping rules 1530 contain information for identifying the organization of a SVS. For example, the stripe algorithm ID field 1515 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. The stripe width field 1510 specifies the size/width of each stripe. The ordered list of volumes field 1520 contains the IDs of the volumes comprising the SVS. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin.

A Locate( ) function 375 is provided that enables the VSM 370 and other modules (such as those of N-blade 310) to locate a D-blade 350 and its associated volume of a SVS 1400 in order to service an access request to a file. The Locate( ) function takes as arguments, at least (i) a SVS ID 1505, (ii) an offset within the file, (iii) the inode number for the file and (iv) a set of striping rules 1530, and returns the volume 910 on which that offset begins within the SVS 1400. For example, assume a data access request directed to a file is issued by a client 180 and received at the N-blade 310 of a node 200, where it is parsed through the multi-protocol engine 325 to the appropriate protocol server of N-blade 310. To determine the location of a D-blade 350 to which to transmit a CF message 400, the N-blade 310 may first retrieve a SVS entry 1500 to acquire the striping rules 1530 (and list of volumes 1520) associated with the SVS. The N-blade 310 then executes the Locate( ) function 375 to identify the appropriate volume to which to direct an operation. Thereafter, the N-Blade may retrieve the appropriate VLDB volume entry 1200 to identify the aggregate containing the volume and the appropriate VLDB aggregate entry 1300 to ultimately identify the appropriate D-blade 350. The protocol server of N-blade 310 then transmits the CF message 400 to the D-blade 350.

Figure 16:
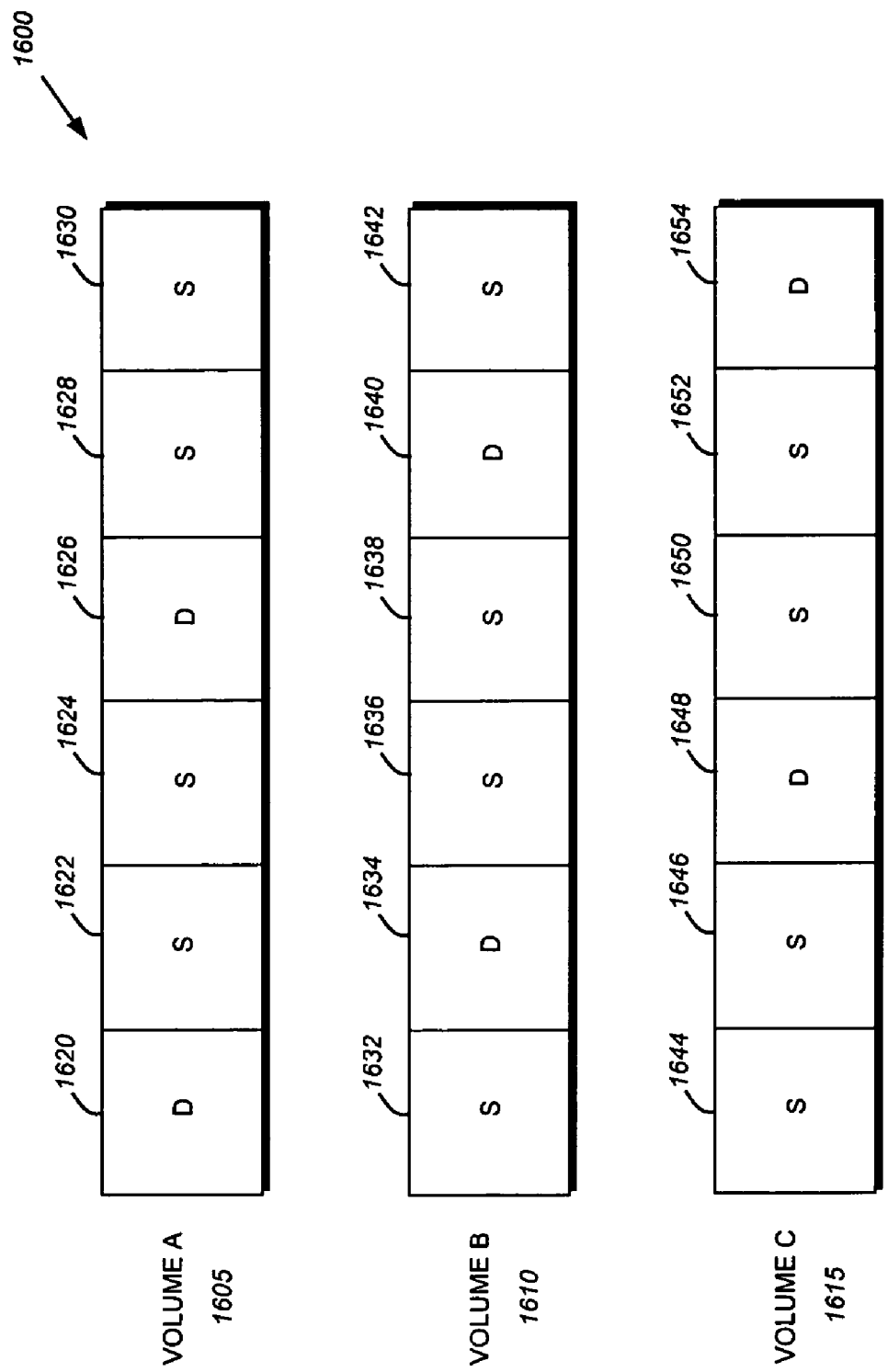
FIG. 16 is a schematic block diagram illustrating the periodic sparseness of file content stored on volumes of a SVS in accordance with an embodiment of the present invention.

FIG. 16 is a schematic block diagram illustrating the periodic sparseness of file is content stored on volumes A 1605, B 1610 and C 1615 of SVS 1600. As noted, file content is periodically sparse according to the SVS striping rules, which specify a striping algorithm (as indicated by stripe algorithm ID field 1515) and a size/width of each stripe (as indicated by stripe width field 1510). Note that, in the illustrative embodiment, a stripe width is selected to ensure that each stripe may accommodate the actual data (e.g., stored in data blocks 806) referenced by an indirect block (e.g., level 1 block 804) of a file.

In accordance with an illustrative round robin striping algorithm, volume A 1605 contains a stripe of file content or data (D) 1620 followed, in sequence, by two stripes of sparseness (S) 1622, 1624, another stripe of data (D) 1626 and two stripes of sparseness (S) 1628, 1630. Volume B 1610, on the other hand, contains a stripe of sparseness (S) 1632 followed, in sequence, by a stripe of data (D) 1634, two stripes of sparseness (S) 1636, 1638, another stripe of data (D) 1640 and a stripe of sparseness (S) 1642. Volume C 1615 continues the round robin striping pattern and, to that end, contains two stripes of sparseness (S) 1644, 1646 followed, in sequence, by a stripe of data (D) 1648, two stripes of sparseness (S) 1650, 1652 and another stripe of data (D) 1654.

H. Data Consistency Guarantees

The present invention is directed to a system and method for efficiently guaranteeing data consistency to clients for one or more data containers stored on a plurality of volumes configured as a SVS. As noted, the SVS comprises one MDV configured to store a canonical copy of certain meta-data, including access control lists and directories, associated with all data containers stored on the SVS, and one or more DVs configured to store, at least, data content of those containers. In addition, for each data container stored on the SVS, one volume is designated the CAV and, as such, is configured to store certain, rapidly-changing attribute meta-data, including timestamps and length, associated with that container.

Figure 17:
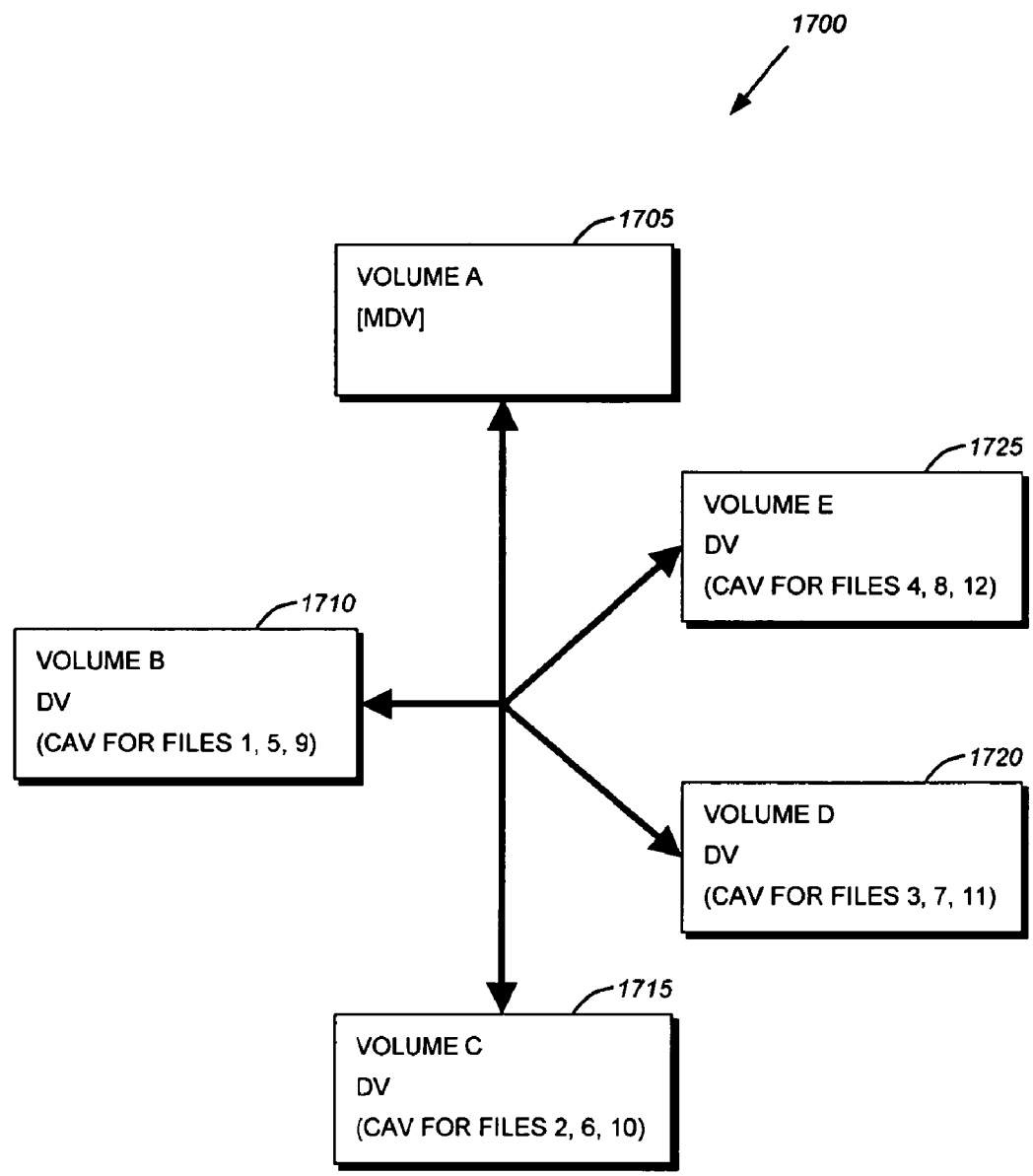
FIG. 17 is a schematic block diagram of an exemplary SVS in accordance with an embodiment of the present invention.

FIG. 17 is a schematic block diagram of an exemplary five volume SVS environment 1700 in accordance with an embodiment the present invention. The SVS 1700 comprises five volumes, namely volume A 1705, volume B 1710, volume C 1715, volume D 1720 and volume E 1725. It should be noted that five volumes are shown for illustrative purposes only and that the teachings of the present invention may be utilized with SVSs having any number of volumes. In the illustrative environment 1700, volume A 1705 is designated the MDV, with the other four volumes functioning as DVs associated with the SVS.

Twelve data containers, e.g., files (files 1-12), are illustratively stored on the volumes of the SVS, wherein each volume serves as the CAV for any file whose first stripe is stored therein. Notably, the CAV is a role that the MDV or DV serves for a particular file to store (and serve) rapidly-changing attribute meta-data for the file. Thus, for example, volume B 1710 serves as the CAV for files 1, 5, 9. Similarly, volume C 1715 serves as the CAV for files 2, 6 and 10, volume D 1720 serves as the CAV for files 3, 7 and 11 and volume E serves as the CAV for files 4, 8 and 12. Volume A 1705, which serves as the MDV for the SVS does not, in the illustrative embodiment, serve as the CAV for any files. In alternate embodiments, the MDV may serve as the CAV for files. By distributing the role of the CAV among the SVS volumes, each volume serves as a CAV for an approximately equal number of files.

The meta-data associated with the files stored on the SVS are illustratively organized into various categories (e.g., MD1-MD3) along functional boundaries and are resident on various volumes to optimize data access (e.g., read and write) paths through the SVS. These categories include (i) MD1 meta-data that changes on every data access (read/write) request served by the SVS, (ii) MD2 meta-data that may be retrieved (but not changed) on every request and (iii) MD3 meta-data that is unused for the read/write requests. Since it changes on every read/write request served by the DVs of the SVS, the MD1 meta-data is canonically resident on the CAV and generally cached on the DVs. Likewise, since it may be retrieved, but does not change, on every request served by the DVs, the MD2 meta-data is canonically resident on the MDV and generally cached on all DVs of the SVS, including the volume designated as CAV. Finally, since it is unused for a read/write request, the MD3 meta-data is canonically, and solely, resident on the MDV.

Figure 18:
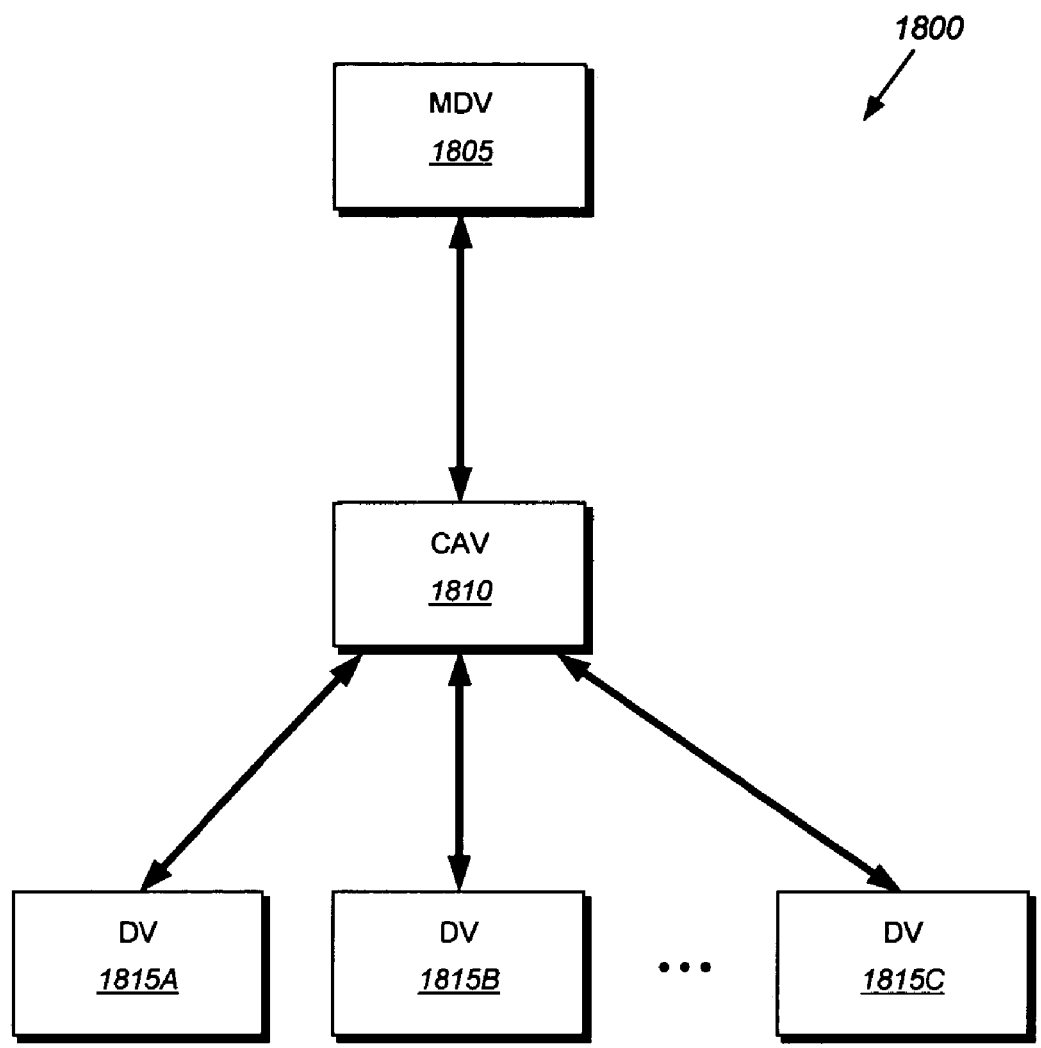
FIG. 18 is a schematic block diagram of an exemplary SVS in accordance with an embodiment of the present invention

In the illustrative embodiment, the CAV cooperates with the MDV and DVs of the SVS to provide a multi-tier caching and distribution architecture that offloads meta-data access requests that would otherwise be directed to the MDV. FIG. 18 is a schematic block diagram of an exemplary multi-tier meta-data caching and distribution hierarchical environment 1800 in accordance with an embodiment of the present invention. As noted, MDV 1805 stores a canonical copy of MD2 and MD3 meta-data for all of the files stored on the SVS. Here, the CAV is utilized as a first tier caching and distribution point for storing and distributing most meta-data, e.g., MD1 and MD2, for use by the DVs 1815.

As noted above, every volume within the SVS serves as a CAV for a portion of the files stored on the SVS. Illustratively, the volume storing the first stripe of the file is deemed to be the CAV. Thus, different volumes of the environment 1800 may serve as the CAV 1810 depending on the particular files. Moreover, the MDV may serve as the CAV for certain files. In such a case, the roles of the CAV and MDV are merged due to the fact that the volume contains a canonical copy of all (MD1-MD3) meta-data. For those files stored on a SVS volume having a merged CAV/MDV role, no first tier caching and distribution point is utilized in the hierarchical environment 1800.

Data consistency guarantees of data containers, e.g., files, stored on the SVS is generally provided by delegating to the DVs sufficient authority to autonomously service I/O requests directed to the files using at least some of the rapidly-changing attribute meta-data, e.g., the timestamps, of the files. As noted, each node includes a D-blade 350 configured to service a volume, such as the MDV 1805, DV 1815 or CAV 1810. To further facilitate a description and understanding of the present invention, references to the "MDV", "DV" and "CAV" may include the D-blades configured to service those volumes. Specifically, a DV 1815 is only allowed to service I/O requests, e.g., read and write operations, to a file if it has a valid ticket book for the file. A DV requests and is granted the ticket book from the CAV 1810 on a per-file basis, although a DV may have any number of allocated ticket books based on the number of outstanding or currently active files.

Figure 19:
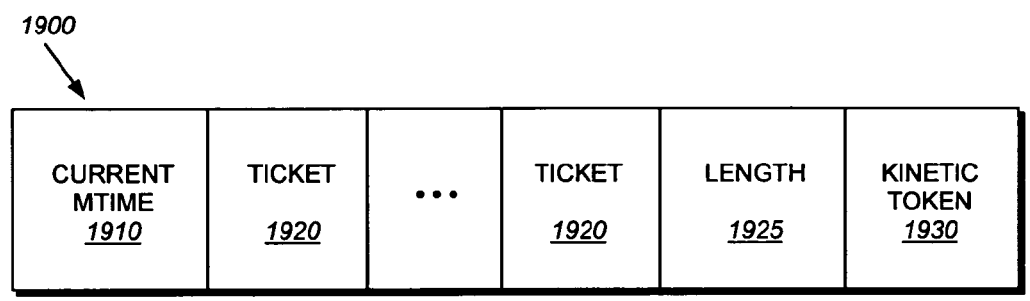
FIG. 19 is a schematic block diagram of a ticket book that may be advantageously used with the present invention.

FIG. 19 is a schematic block diagram of a ticket book 1900 that may be advantageously used with the present invention. The ticket book 1900 is illustratively a data structure generated by the CAV and comprising an indication of current timestamps, such as the current modification time (mtime) 1910, on a file plus zero or more "tickets" 1920, i.e., new mtime values, that the DV is allowed to "hand out" (return) to a client for each new write operation. The types of ticket books illustratively include (i) a read ticket book that contains the current mtime and no tickets and (ii) a write ticket book that contains the current mtime and tickets representing a range of mtimes, e.g., 50 (or 100 or 200) milli-seconds worth of time stamps, that the DV is capable of autonomously returning to the client. Write operations require a write ticket book, while read and prefetch operations require at least a read ticket book. The write ticket book (hereinafter "ticket book") is illustratively a read ticket book with one or more tickets that can be used to change (e.g., increment) the timestamps in response to write operations.

According to one aspect of the present invention, the ticket book 1900 is employed to improve storage system performance for clients that do not require strong serialization semantics. That is, for clients using file system protocols that support weak serialization semantics, such as CIFS, the DV 1815 may utilize the ticket book in a manner that obviates the need to guarantee that the mtimes, as perceived by the clients, always increase. For clients using file system protocols that require strong serialization semantics, the DV may only use the ticket book if it received file operations prior to requesting (and granting of) that ticket book. Otherwise, a new ticket book must be requested (and granted) from the CAV 1810 to process the received file operations. Use of the ticket book in connection with weak serialization semantics thus reduces the number of round trip exchanges needed between the DV and CAV to service file operations. In other words, because the DV does not have to stall operation requests waiting for the grant of a new ticket book, the number of round trip exchanges is reduced compared to the number of round trip exchanges needed for protocols that require strong serialization semantics.

Figure 20:
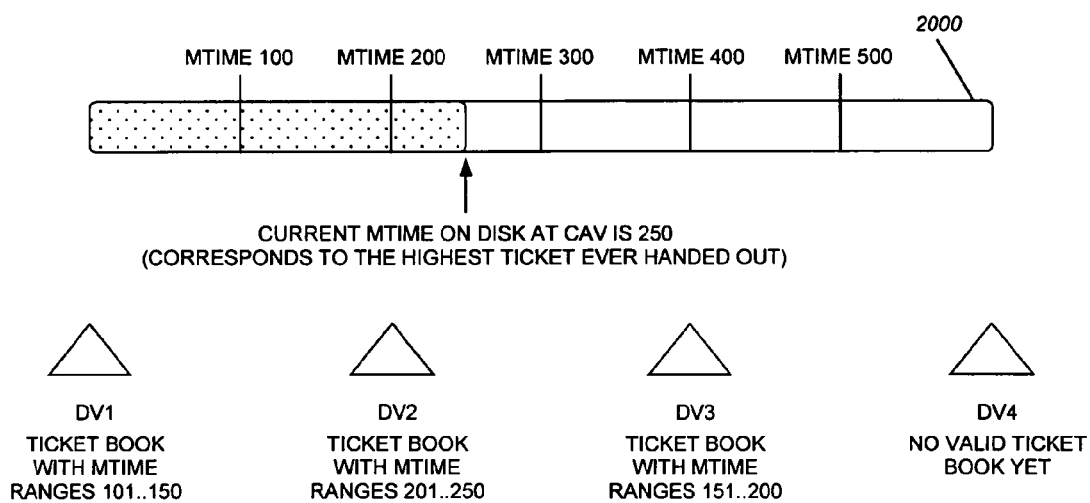
FIG. 20 is a schematic block diagram illustrating allocation of ticket books in accordance with the present invention.

FIG. 20 is a schematic block diagram illustrating allocation of ticket books in accordance with the present invention. A timeline 2000 is indexed by the mtime for a particular file. By allocating or "granting" ticket books to the DVs 1815, the CAV 1810 has effectively delegated ranges of the timeline 2000 for the file to those DVs, wherein the timeline pertains to I/O requests, such as read and/or write operations, directed to the file. Specifically, DV1 has a ticket book with a timestamp range that spans mtimes 101 to 150 Likewise, DV3 has a ticket book with an mtime range from 151 to 200 and DV2 has a ticket book with mtimes that span 200-250. It should be noted that none of the mtime ranges overlap. Every time the CAV grants a new ticket book to a DV, the tickets in the book represent a new range of timestamps on that timeline. For each new ticket book granted, the CAV 1810 returns tickets that have higher mtime values than any previous grant. For example, the next (write) ticket book granted to, e.g., DV4 may include tickets for mtimes 251 through 300.

When servicing a read operation, each DV returns the lowest mtime in its current ticket book to the requesting client. When servicing a write operation, however, the DV increases (e.g., increments) the mtime before returning it to the client. Moreover, the DV assigns a ticket 1920 from the ticket book 1900 to the write operation atomically with the step of committing the write to disk. These two aspects combine to guarantee that every new write operation that a DV completes will be assigned a post-operation mtime value that is higher than any mtime that the DV has associated with any earlier operation.

In addition, each DV allocates the mtimes of its delegated range in sequence. For example, assume DV1 has a ticket book for file A with an mtime range of 101 to 150. In response to a first read operation directed to the file, DV1 returns mtime 101 with the data. Subsequently, in response to a first write operation directed to the file, DV1 increments the mtime from 101 to 102 and returns mtime 102 with the request's post-operation attributes. DV1 then removes ticket 1920 reflecting mtime 102 from its book such that the new range is 103 to 150. Any subsequent read operations directed to the file return current mtimes of 102 until a second write operation is issued, at which time the incremented mtime 103 is returned. When it depletes those mtimes, i.e., when it returns mtime 150 and runs out of tickets, DV1 requests a new ticket book from the CAV. Alternatively, if a DV only has a read ticket book, then it must obtain a new range of the timeline from the CAV before it can service any more write operations.

Notably, there is no guarantee that the mtime always reflects "wall clock" time, i.e., the actual time of day. That is, in some circumstances it is possible (and acceptable) for a particular client to issue an I/O request (e.g., a first write operation) and receive an acknowledgment with a first mtime (e.g., 100) and then synchronously issue a second write operation and receive a smaller mtime (e.g., 50) even though the client has knowledge that the second write operation occurred after the first write operation. For example, assume that a client issues a first write operation to a first region (e.g., a stripe) of a file that is serviced by DV2 and waits for a response before proceeding with any further operations. DV2 performs the first write operation and returns mtime 201 to client for that operation. The client then issues a second write operation to a second, different stripe of the file that is serviced by DV1. DV1 performs the second write operation and returns mtime 101 to the client for that operation. Essentially, the client perceives the returned mtimes as proceeding backwards; the mtime for the second write operation is "earlier" even though the client is aware that the first write operation fully completed before the second operation began.

Certain client protocols, such as NFSv2, cannot support this situation and thus require "strong serialization semantics". As used herein, all file operations are serializable using a timeline indexed by a file's mtime. For causally connected operations, increasing mtimes correlate with increasing wall clock time. If a client protocol requires strong serialization semantics, increasing mtimes correlate with increasing wall clock time. However, those client protocols that can support the situation described above accept "weak serialization semantics" and the present invention provides optimizations to accommodate those protocols. CIFS and, to some extent, NFSv4 client protocols are configured to support weak serialization semantics; accordingly, the ticket book 1900 provides an optimization in support of such semantics. That is, weak serialization semantics allow DV1 to exploit the use of its ticket book by, e.g., obviating the need to guarantee that the mtime, as perceived by the client, always increases. Note that this situation only is manifests when a client's operation requests traverse DVs, i.e., the client transitions from writing to one DV to writing to another DV. As long as the client directs requests to one DV, the mtimes always increase.

In the illustrative embodiment, there are four basic rules governing when a ticket book 1900 currently held by a DV 1815 can be used. If any of these rules fails, then the DV has to obtain a new one from the CAV 1810 before servicing certain operation requests. According to a first rule, a DV must have sufficient "up-to-date" meta-data to service an I/O operation to a file. Otherwise if the meta-data is out-of-date for the file, the DV must obtain that meta-data and, in the process of obtaining that meta-data, the DV obtains a new ticket book. In general, whenever a DV 1815 accesses the CAV 1810 for additional attributes or meta-data, the CAV issues a new ticket book to the DV.

A second rule states that if the ticket book 1900 expires or is otherwise unusable (i.e., all tickets 1920 are exhausted) such that no further write operations can be performed, then the DV must obtain a new ticket book. Here, the ticket book itself becomes a kind of meta-data that the DV may need to retrieve from the CAV. A ticket book may expire based on wall clock time. It is preferable that the timestamps returned to a client be generally close to actual wall clock time. After a predetermined time (e.g., 100 milli-seconds or approximately 10 times a second), the DV discards its current ticket book and obtains a new ticket book the next time a request is issued to the DV. Notably, the new ticket book is obtained "on demand", i.e., when a request is received at the DV that cannot be satisfied using the current ticket book.

Illustratively, an optimization may be invoked for this second rule. If there may still be activity directed to the file and the current ticket book for the file is set to expire shortly, the DV can proactively request a new ticket book for the file so that by the time that the next request is received, the DV has the new ticket book. This optimization is based on a heuristic to decide how frequently the DV should proactively obtain a ticket book without being prompted by an incoming client request. This optimization is similar to a "meta-data" read ahead operation that prepares for a new ticket book in case one is needed. However, if proactive requests are performed too aggressively, the CAV would be overloaded.

A number of different algorithms may be employed that specify when a DV should approach the CAV for a new ticket book. An example of an illustrative algorithm specifies that if at least one I/O operation to a particular file is serviced using a current ticket book for that file and if the ticket book is about to expire within a predetermined time equal to the round trip time to the CAV (e.g., the next 20 milliseconds), then the DV proactively obtains a new ticket book from the CAV.

A third rule involves a situation where an I/O operation, such as a write operation, spans the end of file (EOF). Write operations that span the current EOF change the length of the file. File-length changes are considered causally connected with all other I/O operations; that is, if a file is extended by a write operation and that operation returns post-operation mtime X to the client, then all subsequent I/O operations return mtime values greater than X and all these subsequent operations use the correct, new file length. This is accomplished by providing the following third rule: when a DV 1815 wants to extend the file, it must always go to the CAV 1810 to request a new ticket book.

Therefore, this aspect of the invention is directed to the use of the ticket book with a file extending operation, e.g., a write operation that spans EOF and increases the length of a file. In response to servicing a write operation that attempts to extend the file, the DV advises the CAV as to the new length of the file and, in return, the CAV grants a new ticket book reflective of that new file length. In particular, the CAV invalidates all outstanding ticket books to all DVs, updates the length of the file and returns the new ticket book to the advising DV. Since no other valid ticket books are in use, each DV must poll the CAV for an updated ticket book before servicing a new I/O operation. The new ticket book 1900 has tickets 1920 reflective of higher mtimes, and includes the correct new file length 1925.

For example, assume DV1 services stripes 0 to 2 megabytes of a file, DV2 services stripes 2 to 4 megabytes of the file and the file is currently exactly 2 megabytes in length. While a client issues read operation requests to DV1 for the file, another client decides to extend the length of the file, so it issues a write operation request to DV2. However, DV1 is not notified about that write operation and, as such, its ticket book is not modified or discarded. Therefore, DV1 continues to service read operations to the file as if the length of the file has not increased. The third rule states that if a client tries to span EOF as perceived by a DV (e.g., DV1), then the DV obtains a new ticket book from the CAV. Notably, the new ticket book includes the current length of the file.

This situation is also relevant for write operations because the CAV 1810 is the authority for the file's length. When a DV needs to extend a file via a write operation, it sends a message to the CAV requesting a change of length for the file. The CAV then returns a new ticket book with a new file length attribute that is sufficient to accommodate the write operation. In sum, if any operation request directed to a DV 1815 exceeds the EOF associated with its current ticket book, the DV does not reject that request but rather contacts the CAV for a new ticket book. This third rule provides a way for the DV to obtain a new ticket book from the CAV.

If the new ticket book is returned and the file length has not changed, then the DV proceeds through normal semantics. If a read operation is performed that attempts to span EOF, then the DV returns the number of bytes it was able to read and fills the rest of the request (buffer) with zeros. If a write operation is performed that attempts to span EOF, the DV advises the CAV as to the new length of the file. The CAV makes the necessary change to the file length and returns a new ticket book reflecting the change in file length up to the end of the write operation.

The fourth rule relates to strong serialization semantics. Specifically, the contents of a ticket book can be trusted (used) if (a) weak serialization semantics are used, in which case this rule does not apply, or (b) strong serialization semantics are used and at least one of two tests is satisfied. The first test is whether the DV has a kinetic token. If so, then the DV can use the current ticket book. If not, then the DV must consider the time on the local machine (e.g., the filer) when the ticket book was requested and the time that the incoming file operation request arrived. If the ticket book was requested after that file operation arrived, then the DV can use the ticket book; otherwise the DV cannot use the ticket book (i.e., the ticket book must be discarded and new one obtained from the CAV).

Figure 21:
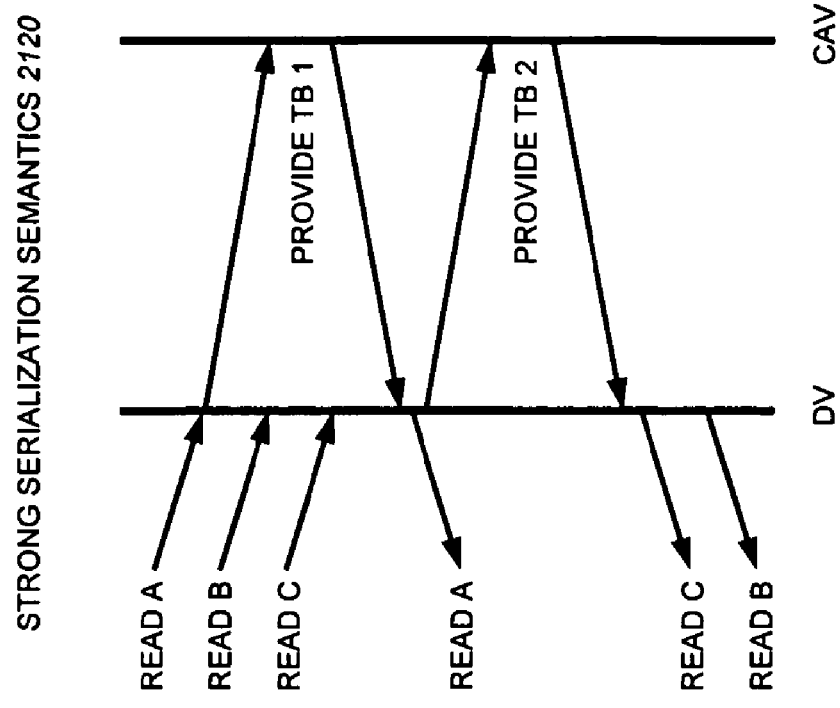
FIG. 21 is a schematic diagram illustrating the affects of weak and strong serialization semantics on storage system performance in accordance with the present invention.
Figure 21:
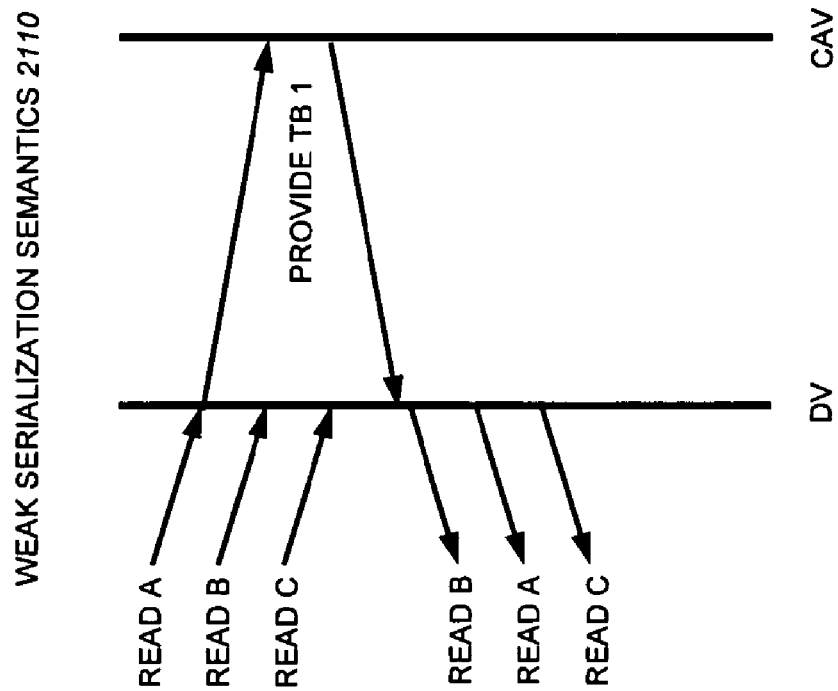

FIG. 21 is a schematic diagram illustrating the affects of weak and strong serialization semantics on storage system performance in accordance with the present invention. Referring to the weak serialization semantics graph 2110, the DV requests a new ticket book (TB 1) when it receives a first I/O operation (e.g., a read operation) and then two more read operations are received while it is waiting for that new ticket book to arrive. As soon as that ticket book is returned, the DV is able to service all stalled read operations (e.g., Reads A-C) using the new ticket book. More specifically, Read A is received by the DV and the DV requests a new ticket book from the CAV. While it is waiting for that new ticket book, DV receives Reads B and C, which are stalled because there is no ticket book to service them. However, the DV does not have to start a new round trip to the CAV for each of those read operations; instead those operations wait on the new ticket book. Once the new ticket book arrives, the DV starts servicing all of the stalled read operations and, notably, they are not necessarily serviced in the order in which they arrived at the DV.

For example, the DV may have started servicing Read A but encountered a portion of the file for an indirect block it does not yet have and, accordingly, Read A is stalled. Meanwhile DV services Read B. If all three Reads A, B, and C are outstanding at the same time from the client's point of view, there is no guarantee as to the order in which the storage system (i.e., D-blade 350) will service the requests. Note that this also applies to outstanding write operations. The only requirement is that once it chooses an order in which to service the (read and/or write) operations, the DV must return mtimes that are consistent with that order. Since all three operation requests were "in flight" simultaneously, the client provides no guarantees for which one is actually going to reach the D-blade first, much less which one gets serviced first. Client protocols that can handle weak serialization semantics are not concerned about the ordering of the operations in real time versus the ticket book mtimes. As noted, the only requirement is that the order in which the operations are serviced (e.g., Reads B, A, C) is consistent with the mtimes that are returned.

In the case of strong serialization semantics graph 2120, the DV receives a first I/O operation (Read A) and, in response, sends a message to the CAV requesting a new ticket book (TB 1). Meanwhile, two more operations (Reads B and C) are received by the DV. When the new ticket book is returned by the CAV, the DV determines that the ticket book is acceptable for servicing Read A, but cannot be used to service Reads B and C because those latter read operations (B and C) arrived at the D-blade after the DV had requested the new ticket book. Accordingly, the DV sends another message to the CAV requesting another new ticket book (TB 2). If Reads A, B and C had arrived before the new ticket book was requested, then the DV would be able to service all three operations with the ticket book TB 1. The last rule states that the DV can only trust (i.e., use) the ticket book for file operations that arrived before the DV had requested the ticket book. It is preferable to avoid strong serialization semantics because of the latencies involved; accordingly, the invention provides a further optimization, called kinetic tokens.

According to yet another aspect of the invention, a kinetic token 1930 is provided that represents an optimization that enables the storage system to defeat caching behavior at the client and improve the performance of file operations. A kinetic token is a guarantee that every time a client requests the current mtime on the file, the client will receive a higher value than has ever been previously reported. Issuance of a kinetic token by the CAV effectively disables client-side caching because every time the client requests the current mtime, it will receive a higher mtime value. As soon as that guarantee is provided, then the ordering problem for strong serialization semantics is eliminated because the clients no longer caches any data (and, as such, it does not matter what mtime value the storage system returns). The kinetic token provides a guarantee that client-side caching is disabled as clients will always see higher mtimes returned. If the DV receives a request that requires strong semantics, the DV utilizes the technique described above and obtains a new ticket book before servicing the request.

The kinetic token is illustratively granted in recognition that there is a relatively common file access pattern. For example, if many write operations are received by a DV 1815 to a particular file, then the mtimes returned to the clients issuing those operations are constantly being updated (incremented). Recall that every write operation results in updating/incrementing of the mtime on the file. In the case of client-side caching, this pattern of activity forces the client to discard the contents of its cache. The CAV may decide to issue kinetic tokens with the ticket book for heavy write access to the file where the mtimes are changing frequently. That is, frequent activity on the file denotes that the CAV is servicing many requests for ticket books 1900 for the same file, often to one or more DVs. If the CAV heuristically determines that many ticket book requests are received for a particular file, it can choose to issue kinetic tokens for that file. Illustratively, the kinetic token 1930 is implemented as a Boolean flag within the ticket book 1900 that, when asserted, specifies existence of the token.

At some point, the ticket book 1900 with kinetic token 1930 expires or the CAV 1810 may revoke the kinetic token. In order for a DV 1815 to manipulate meta-data on the file, the CAV instructs all DVs 1815 that currently have kinetic tokens 1930 to relinquish those tokens. Illustratively, the CAV broadcasts to the DVs a message instructing them to relinquish their kinetic tokens. Once all the DVs have acknowledged that they have given up their tokens, the CAV may halt automatic incrementing of mtimes on query.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Also the data structures is described herein may include additional fields for storing additional information. Therefore, it is the object of the appended claims to cover all such variations and modifications as come within the true spirit and scope of the invention.

What is claimed is:

1. A method for operating a computer storage system, comprising:
   providing at least one data volume of a plurality of volumes, the at least one data volume configured to store a data content of a data container, and the plurality of volumes organized as a striped volume set (SVS), wherein each volume of the plurality of volumes serves as a container attribute volume (CAV) for any data container whose first stripe is stored therein, the CAV configured to store a copy of the plurality of mtimes for each data volume the CAV serves;
   generating, by a processor associated with the CAV, a data structure on the CAV corresponding to at least one selected data volume, the data structure having a plurality of permitted modification times (mtimes) to modify a data stored in the data container on the at least one selected data volume;
   issuing, by the CAV, the data structure to the at least one selected data volume;
   transmitting, by the at least one selected data volume, the mtimes in the data structure to a client in response to a request from the client for an I/O operation on the data stored in the at least one selected data volume; and
   performing, in response to an mtime included in the data structure transmitted to the client, an atomic I/O operation by the at least one selected data volume without having to re-request access to the data from the CAV on the SVS.

2. The method as in claim 1, further comprising:
   transmitting a selected mtime to a client;
   requesting an I/O operation by a client in response to the selected mtime.

3. The method as in claim 2, further comprising:
   receiving a request for the I/O operation from a client;
   performing the step of generating a data structure having a plurality of permitted modification times (mtimes) in response to the request.

4. The method as in claim 1, further comprising:
   storing the data container in a data volume;
   directing I/O operations to the data volume by a storage volume; and
   executing, by the storage volume, atomic I/O operations on the data volume in response to the mtimes.

5. The method as in claim 4, further comprising:
   performing the step of generating a data structure having a plurality of permitted modification times (mtimes) by the data volume.

6. The method as in claim 1, further comprising:
   performing the step of generating a data structure having a plurality of permitted modification times (mtimes) by the one or more storage devices.

7. The method as in claim 1, further comprising:
   referring to the data structure having a plurality of permitted modification times as a ticket book.

8. The method as in claim 1, further comprising:
   using a computer readable media as the data storage devices.

9. The method as in claim 8, further comprising:
   using a raid array as the computer readable media.

10. A computer storage system, comprising:
    at least one data volume of a plurality of volumes, the at least one data volume configured to store a data content of a data container, and the plurality of volumes organized as a striped volume set (SVS), wherein each volume of the plurality of volumes serves as a container attribute volume (CAV) for any data container whose first stripe is stored therein, the CAV configured to store a copy of the plurality of mtimes for each data volume the CAV serves;
    a data structure on the CAV corresponding to at least one selected data volume, the data structure, generated by a processor associated with the CAV, and having a plurality of permitted modification times (mtimes) for modification of data stored in the data container on a selected data storage device, the mtimes to be transmitted, by the at least one selected data volume, to a client in response to a request from the client for an I/O operation on the data stored in the at least one selected data volume, wherein the CAV issues the data structure to the at least one selected data volume; and
    the storage system to perform an atomic I/O operation in response to an mtime included in the data structure transmitted to the client without having to re-request access to the data from the CAV on the SVS.

11. The computer storage system of claim 10, further comprising:

a processor to transmit a selected mtime to a client;
an I/O operation requested by a client in response to the selected mtime.

12. The computer storage system of claim 10, further comprising:
a request for the I/O operation received from a client;
an operating system to generate the data structure having a plurality of permitted modification times (mtimes) in response to the request.

13. The computer storage system of claim 10, further comprising:
the data container stored in a data volume;
I/O operations directed to a storage volume by data volume; and
the storage volume to execute atomic I/O operations on the data volume in response to the mtimes.

14. The computer storage system of claim 10, further comprising:
a data volume to generate a data structure having a plurality of permitted modification times (mtimes).

15. The computer storage system of claim 10, further comprising:
the one or more storage devices to generate a data structure having a plurality of permitted modification times (mtimes).

16. The computer storage system of claim 10, further comprising:
the data structure having a plurality of permitted modification times is referred to as a ticket book.

17. The computer storage system of claim 10, further comprising:
a computer readable media used as the data storage devices.

18. The computer storage system of claim 17, further comprising:
a raid array used as the computer readable media.

19. A method for operating a computer storage system, comprising:
providing at least one data volume of a plurality of volumes, the at least one data volume configured to store a data content of a data container, and the plurality of volumes organized as a striped volume set (SVS), wherein each volume of the plurality of volumes serves as a container attribute volume (CAV) for any data container whose first stripe is stored therein, the CAV configured to store a copy of the plurality of mtimes for each data volume the CAV serves;
receiving a request for an I/O operation from a client;
generating, by a processor associated with the CAV, a data structure on the CAV corresponding to at least one selected data volume, the data structure having a plurality of permitted modification times (mtimes) for modification of data stored in the data container on the at least one selected data volume, the data structure allowing a client to access the data by picking any one of the plurality of mtimes to access the data;
issuing by the CAV the data structure to the at least one selected data volume;
transmitting, by the at least one selected data volume, the mtimes included in the data structure to the client in response to a request from the client for an I/O operation on the data stored in the at least one selected data volume; and
performing, in response to an mtime included in the data structure transmitted to the client, an atomic I/O operation by the at least one selected data volume without having to re-request access to the data from the CAV on the SVS.

20. A computer storage system, comprising:
at least one data volume of a plurality of volumes, the at least one data volume configured to store a data content of a data container, and the plurality of volumes organized as a striped volume set (SVS), wherein each volume of the plurality of volumes serves as a container attribute volume (CAV) for any data container whose first stripe is stored therein, the CAV configured to store a copy of the plurality of mtimes for each data volume the CAV serves;
a port to receive a request for an I/O operation from the client;
a data structure on the CAV corresponding to at least one selected data volume, the data structure, generated by a processor associated with the CAV, having a plurality of permitted modification times (mtimes) for modification of data stored in the data container on a selected data storage device;
an mtime included in the data structure to be transmitted to the client by the at least one selected data volume wherein the mtime is issued by the CAV to the at least one selected data volume in response to a request from the client for the i/o operation on the data stored in the at least one selected data volume; and
an atomic I/O operation performed by the at least one selected data volume, in response to an mtime in the data structure being transmitted to the client.

21. A computer readable medium containing executable program instructions executed by a processor, comprising:
program instructions that provide at least one data volume of a plurality of volumes, the at least one data volume configured to store a data content of a data container, and the plurality of volumes organized as a striped volume set (SVS), wherein each volume of the plurality of volumes serves as a container attribute volume (CAV) for any data container whose first stripe is stored therein, the CAV configured to store a copy of the plurality of mtimes for each data volume the CAV serves;
program instructions that generate, by a processor associated with the CAV, a data structure on the CAV corresponding to at least one selected data volume, the data structure having a plurality of permitted modification times (mtimes) to modify a data stored in the data container on the at least one selected data volume;
is program instructions to issue by the CAV the data structure to the at least one selected data volume;
program instructions that transmit, by the at least one selected data volume, the mtimes included in the data structure to a client in response to a request from the client for an I/O operation on the data stored in the at least one selected data volume; and
program instructions that perform, in response to an mtime included in the data structure transmitted to the client, an atomic I/O operation by the at least one selected data volume without having to re-request access to the data from the CAV on the SVS.

22. A computer readable containing executable program instructions executed by a processor, comprising:
program instructions that provide at least one data volume of a plurality of volumes, the at least one data volume configured to store a data content of a data container, and the plurality of volumes organized as a striped volume set (SVS), wherein each volume of the plurality of volumes serves as a container attribute volume (CAV) for any data container whose first stripe is stored therein, the CAV configured to store a copy of the plurality of mtimes for each data volume the CAV serves;

program instructions that receive a request for an I/O operation from a client;

program instructions that generate, by a processor of the associated CAV, a data structure on the CAV corresponding to at least one selected data volume, the data structure having a plurality of permitted modification times (mtimes) to modify data stored in the data container on the at least one selected data volume;

program instructions to issue by the CAV the data structure to the at least one selected data volume;

program instructions that transmit, by the at least one selected data volume, the mtimes included on the generated data structure to a client by the at least one selected volume in response to a request from the client for an I/O operation on the data stored in the at least one selected data volume; and program instructions that perform, in response to an mtime included in the data structure to the client, an atomic I/O operation by the at least one selected volume without having to re-request access to the data from the CAV on the SVS.

* * * * *

UNITED STATES PATENT AND TRADEMARK OFFICE
CERTIFICATE OF CORRECTION

PATENT NO. : 7,721,045 B1  Page 1 of 1
APPLICATION NO. : 12/048659
DATED : May 18, 2010
INVENTOR(S) : Michael Kazar et al.

It is certified that error appears in the above-identified patent and that said Letters Patent is hereby corrected as shown below:

Col. 3, Line 50, please amend as shown:
   until the storage system instructs it to return[[ is]] that data to the Col. 7, Line 14, please amend as shown:
   client/server model of information delivery. That is, each[[ is]]

Col. 7, Line 57, please amend as shown:
   and special types of files called virtual[[ is]] disks (hereinafter Col. 12, Line 60, please amend as shown:
   able manner from a source (e.g.,[[ is]] an N-blade 310) to a Col. 18, Line 67, please amend as shown:
   stores a[[ is]] plurality of inodes, including a root directory (RD)

Col. 20, Line 17, please amend as shown:
   odic sparseness of file[[ is]] content stored on volumes A 1605, B Col. 23, Line 64, please amend as shown:
   this situation only[[ is]] manifests when a client's operation Col. 30, Line 48, please amend as shown:
   [[is ]]program instructions to issue by the CAV the data struc- Signed and Sealed this Twenty-sixth Day of October, 2010

David J. Kappos
*Director of the United States Patent and Trademark Office*